(12) United States Patent
Goclowski

(10) Patent No.: US 7,908,180 B2
(45) Date of Patent: Mar. 15, 2011

(54) INTERACTIVE VEHICLE AUCTION AND SALE SYSTEM

(76) Inventor: Keith Goclowski, Sharon, MA (US)

( * ) Notice: Subject to any disclaimer, the term of this patent is extended or adjusted under 35 U.S.C. 154(b) by 2323 days.

(21) Appl. No.: 10/722,662

(22) Filed: Nov. 26, 2003

(65) Prior Publication Data

US 2004/0107160 A1 Jun. 3, 2004

Related U.S. Application Data

(63) Continuation-in-part of application No. 09/649,876, filed on Aug. 28, 2000, now abandoned.

(51) Int. Cl.
*G06Q 30/00* (2006.01)
(52) U.S. Cl. ............... 705/26.3; 705/26.1; 705/27.1; 705/27.2
(58) Field of Classification Search ............. 705/26–27
See application file for complete search history.

(56) References Cited

U.S. PATENT DOCUMENTS

| | | | | |
|---|---|---|---|---|
| 5,774,873 | A | * | 6/1998 | Berent et al. ............ 705/26 |
| 6,449,601 | B1 | * | 9/2002 | Friedland et al. ........... 705/37 |
| 2002/0046148 | A1 | * | 4/2002 | Alaia et al. ............... 705/37 |

OTHER PUBLICATIONS

"Auctions Creep Into All Kinds of Sites (Because They're Fun)" Sally McGraine. New York Times. (Late Edition (East Coast)). New York, NY.: Mar. 29, 2000, p. H.33. Retrieved via ProQuest on Oct. 25, 2010.*
"Would you buy a used car from this site?" David H. Freedman. Forbes. New York: Nov. 29, 1999. p. 51. Retrieved via ProQuest on Oct. 25, 2010.*

* cited by examiner

*Primary Examiner* — Michael A. Misiaszek
(74) *Attorney, Agent, or Firm* — Lambert & Associates; Adam J. Bruno; Gary E. Lambert

(57) ABSTRACT

An online automobile auction, which allows the consumer to participate by using their home or portable computers and accessing the system via an Internet connection. Before the designated time for an auction, the consumer may access the database of available automobiles. Along with displaying visual depictions of the vehicles, the computer system affords the consumer the ability to access statistics on the current inventory of vehicles. Prior to the auction, using an automated auction feature, a plurality of bidders input their minimum starting bid, the maximum bid and the incrementing value. Bidders are also allowed to bid on vehicles during the auction process.

8 Claims, 46 Drawing Sheets

Figure 1.1

| Field | Bid Value (X) |
|---|---|
| 1 | X | ← Winning or high bidder when two minute timer runs to zero |
| 2 | X |
| 3 | X |
| 4 | X |
| 5 | X |
| 6 | X |
| 7 | X |
| 8 | X |
| 9 | X |
| 10 | X |

Figure 19

Welcome

Auto Salvage Bid.com provides auto dealers and self-insured parties a cost effective and convenient way to sell vehicles through our on line auction or fixed price sales. Our second purpose is to provide auto dealers with an extremely convenient and economical way to purchase vehicles on the Internet.

This company is exclusively an on line auction, modeled after a live auction. Auto Salvage Bid.com auctions small lots of vehicles throughout the day. The auction gives each bidder a short period of time to beat the highest bidder and reset the clock. Potentially, the highest bidder has the ability to own a vehicle in less than three minutes! Why leave the office?

Unlike a live auction, Auto Salvage Bid.com also offers the bidder, who is not available at the time of the auction, the flexibility of placing a bid through the automated bidding feature. With this feature you can become the winning bidder even while playing a round of golf!

Lastly, the company offers vehicles at fixed prices. This option gives the seller the freedom to set a fair price and move the vehicle as soon as it is posted.

We do all of the dirty work. For the seller it is as easy as picking up the phone or applying on line for our service. We take the pictures, fill out the forms and input the information for you! For the buyer there is no waiting. Just like a live auction the high bidder wins quickly. You do not have to wait for days like other auction sites to find out if you own the vehicle.

The company discloses a substantial amount of information about each vehicle to promote a high level of comfort for both the seller and the buyer. Auto Salvage Bid.com is committed to making your on line bidding experience an enjoyable one.

Figure 20

Logo Auto Salvage Bid.com

Member Log On

Help

| Welcome | Sell Your Vehicle | Sales List | Search & Bid | Walk the Line | Vehicle/Part Locator | Auction Schedule | Auction Watch |

Register as a Bidder

Auto Salvage News

Chat Room

Selling Your Vehicle
Request an appointment in 3 easy steps

Step One — Backround Information

36 ● If you have an account with Auto Salvage Bid.com enter it below and go to step two.

Account Number [ ] — 37

● If you do not have an account with us please fill out the following information:

First Name [ ]   Last Name [ ]
Driver's License Number [ ]   Date [ ]
38 Company Name [ ]   Telephone [ ]
Street [ ]   Fax [ ]
City [ ]   Hours of Availability [ ]
Zip Code [ ]   State [ ]   E-mail [ ]

Step Two — Vehicle Information

39 ● Please enter the required information about your vehicle

Year [ ]   Color [ ]
Make [ ]   Mileage [ ]
Model [ ]   Title Number [ ]

● Sell your vehicle at the auction or for a fixed price? [ ]

Step Three — Submit Your Request

40

41 — [Submit]

- Vehicles are listed by the state they are located.

Figure 22

Logo  Auto Salvage Bid.com  [Member Log On] [Help]

[Welcome] [Sell Your Vehicle] [Sales List] [Search & Bid] [Walk the Line] [Vehicle/Part Locator] [Auction Schedule] [Auction Watch]

Sales List
121 Vehicles listed for Massachusetts                44

| Damage Type | Lot # | YR | Make | Model | Body | Mileage | State and Title Type | Miles to Car | | |
|---|---|---|---|---|---|---|---|---|---|---|
| Burned Interior | 12345 | 99 | Honda | Accord | 4-DR | 100,000 | MA-Clean | 112 | P | |
| Roll Over 43 | 12346 | 94 | Totyota | Camry | 2-DR | 150,000 | MA-Clean | 56 | A | |
| *Note:* | | | | | | | | | | |
| 15 spaces | 5 spaces | 2 | 5 spaces | 10 spaces | 4 spaces | 8 spaces | 27 spaces | 5 | 3 | |

Figure 23

Logo Auto Salvage Bid.com

[Member Log On] [Help]

[Welcome] [Sell Your Vehicle] [Sales List] [Search & Bid] [Walk the Line] [Vehicle/Part Locator] [Auction Schedule] [Auction Watch]

45

*Lot Number 10001*

| Photo-Left Front | Photo-Right Front | Photo-Right Rear | Photo-Left Rear |
|---|---|---|---|
| Photo-Front Interior | Photo-Rear Interior | Photo-Engine Compartment | 15 Second Video of the Engine Starting |

| # | Field | Value | | # | Field | Value |
|---|---|---|---|---|---|---|
| 1 | Location | City / State / Zip Code | | 9 | V.I.N. | Vehicle Identification Number |
| 2 | Auction Date & Time | Date / Time | | 10 | Retail Value Complete | |
| 3 | Year, Make & Model | Year / Make / Model | | 11 | Title Type | |
| 4 | Color | color / Interior / color | | 12 | Damage | |
| 5 | Engine | Description / Cylinders | | 13 | Delivery Available | |
| 6 | Transmission | Type | | 14 | Distance to Vehicle | |
| 7 | Drive | 2-wheel, 4 wheel, etc. | | 15 | Additional Info. | |
| 8 | Mileage | | | 16 | Price is on the next page | |

46

47 [Purchase Vehicle]

Note: This page is referred to as the "Detailed Information/Photographs Page"

Figure 24

Logo Auto Salvage Bid.com

Member Log On

Help

| Welcome | Sell Your Vehicle | Sales List | Search & Bid | Walk the Line | Vehicle/Part Locator | Auction Schedule | Auction Watch |

Lot Number 10001

| Photo-Left Front | Photo-Right Front | Photo-Right Rear | Photo-Left Rear |
|---|---|---|---|
| Photo-Front Interior | Photo-Rear Interior | Photo-Engine Compartment | 15 Second Video of the Engine Starting |

1 Location | City | State | Zip Code    9 V.I.N. | Vehicle Identification Number
2 Auction Date & Time | Date | Time    10 Retail Value Complete
3 Year, Make & Model | Year | Make | Model    11 Title Type
4 Color | color | Interior | color    12 Damage
5 Engine | Description | Cylinders    13 Delivery Available
6 Transmission | Type    14 Distance to Vehicle
7 Drive | 2-wheel, 4 wheel, etc.    15 Additional Info.
8 Mileage    16 Price of Vehicle

48

Purchase Vehicle

49

Figure 25
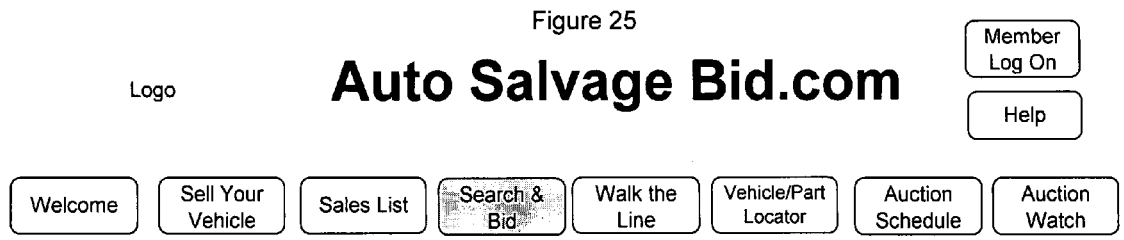
Search & Bid for Future Auctions and Fixed Price Vehicles
Select a *Vehicle Make* using the drop down menu.
50
| Acura |
| Aston Martin |
| Audi |
| Etc. |
51
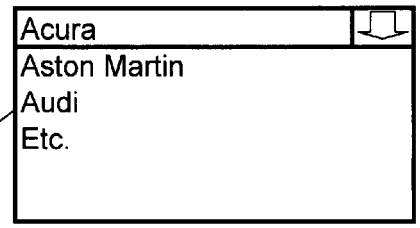
52

Search & Bid for Future Auctions and Fixed Price Vehicles

Step Two — Select a *Vehicle Model* using the drop down menu.
53

Vehicle Make:
Toyota
54

Avalon
Camry
Celica
Etc.

Step Three — Choose a starting and ending year using the drop down menus.
55

1978  Begin
56

1983  End
57

Step Four — Enter your zip code to determine the distance a vehicle is from you.
58

Zip Code
59

Auto Salvage Bid.com

[Logo] [Member Log On] [Help]

[Welcome] [Sell Your Vehicle] [Sales List] [Search & Bid] [Walk the Line] [Vehicle/Part Locator] [Auction Schedule] [Auction Watch]

Search results for

61 → 1978 - 1999 Toyota Camry

| Damage Type | Lot # | YR | Make | Model | Body | Mileage | State and Title Type | Miles to Car | |
|---|---|---|---|---|---|---|---|---|---|
| Burned Interior | 12345 | 99 | Toyota | Camry | 4-DR | 100,000 | MA-Clean | 56 | P |
| Roll Over | 12346 | 94 | Toyota | Camry | 2-DR | 150,000 | MA-Clean | 101 | A |

62

63 → 2 items were found

[New Search]
64

Note: This list is the same format as the sales list. The search will be listed by distance starting with the vehicle closest to the zip code entered.

Figure 28

Logo Auto Salvage Bid.com

Member Log On

Help

| Welcome | Sell Your Vehicle | Sales List | Search & Bid | Walk the Line | Vehicle/Part Locator | Auction Schedule | Auction Watch |

Can't Make it to the Auction?

Please enter your auto bid values below for Lot Number 10001

| Photo | 1999 Toyota Camry LE |
| | Retail Value Complete $13,500 |
| | Auction Date & Time  ####### 10:00AM |
| | Location-City & State   New Haven   CT |

65

66 → Enter your maximum bid value ▢

67 → Enter your starting bid value ▢

Your bids will be incremented according to the following chart:

| Price of Vehicle | Bid Increment |
| --- | --- |
| $1.00 - $500 | $20 |
| $501 - $5000 | $25 |
| 5,001 - $50,000 | $50 |

68

69 → Submit Auto Bid

Figure 29

Logo Auto Salvage Bid.com

Member Log On

Help

| Welcome | Sell Your Vehicle | Sales List | Search & Bid | Walk the Line | Vehicle/Part Locator | Auction Schedule | Auction Watch |

Confirm your bid and watch the clock!

Photo of the vehicle

Auction starts at  10:18AM  On  2/7/2000
Lot Number  12345
Year  Make  Model
1995  Honda  Accord Bid Value  Increment
5200  100
73  74

Time Remaining
1:28:07
70

Total Bids
32
71

Top Ten Bids
1
2
3
4
5
6
7
8
9
10
72

Messages appear here, such as: "You are the winning bidder!" "You did not make the top ten list" or "You are the highest bidder, but did not meet the minimum bid"

75

Confirm Bid Screen

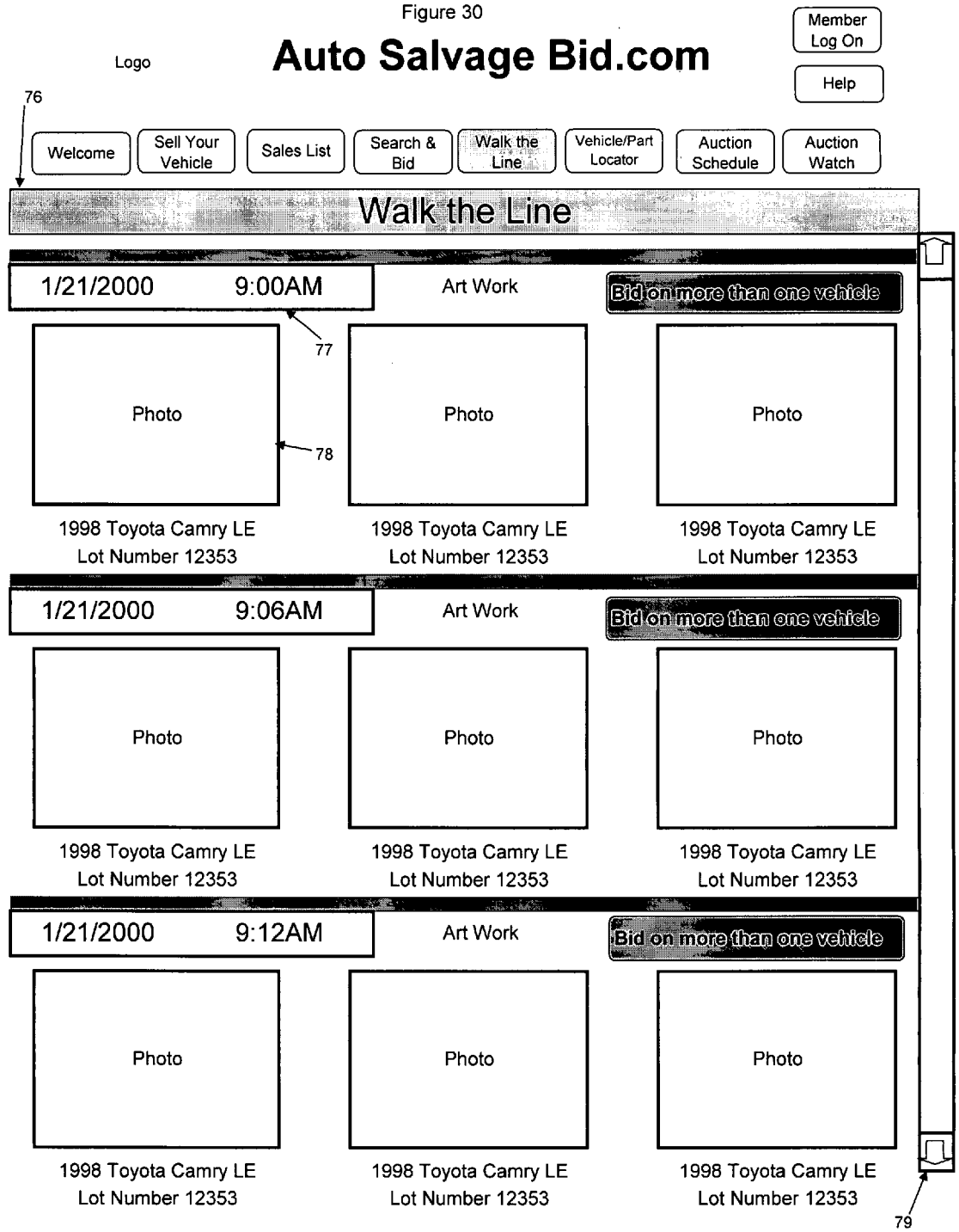

Figure 31

Logo Auto Salvage Bid.com

[ Member Log On ]
[ Help ]

[ Welcome ] [ Sell Your Vehicle ] [ Sales List ] [ Search & Bid ] [ Walk the Line ] [ Vehicle/Part Locator ] [ Auction Schedule ] [ Auction Watch ]

Vehicle/Part Locator for Past Auctions

| Photos | Description and Location of Vehicle | Distance | Sale Date |
|---|---|---|---|
| Photo of Vehicle | 1994 Toyota Camry LE  80<br>126 Auto Parts Inc.<br>Boston, MA 01234<br>(617) 445-1298 | 15 Miles | 4/24/2000 |
| Photo of Vehicle | 1994 Toyota Camry LE<br>126 Auto Parts Inc.<br>Boston, MA 01234<br>(617) 445-1298 | 15 Miles | 4/24/2000 |
| Photo of Vehicle | 1994 Toyota Camry LE<br>126 Auto Parts Inc.<br>Boston, MA 01234<br>(617) 445-1298 | 15 Miles | 4/24/2000 |
| Photo of Vehicle | 1994 Toyota Camry LE<br>126 Auto Parts Inc.<br>Boston, MA 01234<br>(617) 445-1298 | 15 Miles | 4/24/2000 |

Note: This module uses the same search format as "Search and Bid" but searches old auction lists linked to the winning bidder's address so the individual searching for a part may find where the vehicle went.

Figure 32

Logo Auto Salvage Bid.com

Member Log On

Help

| Welcome | Sell Your Vehicle | Sales List | Search & Bid | Walk the Line | Vehicle/Part Locator | Auction Schedule | Auction Watch |

81 →

Next Month ➡

Auction Schedule          January 2000

83

| Monday | Tuesday | Wed | Thursday | Friday | Saturday | Sunday |
|--------|---------|-----|----------|--------|----------|--------|
|        |         |     |          |        | 1        | 2      |
| 3      | 4 Mass Conn | 5 | 6    | 7 Mass Conn | 8    | 9      |
| 10     | 11      | 12  | 13       | 14     | 15       | 16     |
| 17     | 18      | 19  | 20 Mass Conn RI | 21 | 22    | 23     |
| 24     | 25      | 26  | 27       | 28     | 29       | 30     |
| 31     |         |     |          |        |          |        |

85

84

Last Month ⬅

Logo  Auto Salvage Bid.com  [Help]

Auction Watch

94 → Lot Number 10001

| Photo | 1999 Toyota Camry LE |
|---|---|
| | Retail Value Complete    $13,500 |
| | Auction Date & Time    #######    10:00AM |
| | Location-City & State    New Haven    CT |

95 → Start Time
9:06:00

96 → Timer
1:52:04

A
r
t
w
o
r
k

| Top Ten Bids | | |
|---|---|---|
| 1 | $ | 5895 |
| 2 | $ | 5800 |
| 3 | $ | 5400 |
| 4 | $ | 5000 |
| 5 | $ | 4985 |
| 6 | $ | 4900 |
| 7 | $ | 3450 |
| 8 | $ | 3400 |
| 9 | $ | 3100 |
| 10 | $ | 2350 |

↑ 97

Bidding in Progress

Figure 35

AutoSalvageBid.com

Logo

P.O. Box 766    Framingham MA 01701    1-877-Auto Bid

Bidder Registration Form

Company Name [                    ]                                98

Address [                    ]

City [        ]    State [    ]    Zip Code [        ]

Mail Address [                    ]
(If different)

City [        ]    State [    ]    Zip Code [        ]

Telephone [        ]    Fax [            ]

Owner's Name [            ]    Driver's License Number [        ]

Business License Number [            ]

Federal Tax I.D. Number or Social Security Number [            ]

Please attach a copy of one of the following licenses:

Dealer's License Number [            ]                               99

Auto Repair License Number [            ]

Dismantler License Number [            ]

Other License Number [            ]    Description [            ]

Credit Card Type [            ]    Credit Card Number [            ]     100

Name on Credit Card [            ]    Expiration Date [            ]

The undersigned, as a lawful representative of the above named business, certifies that the business has one or
more of the above mentioned licenses. I further certify that the business is responsible for its acts, as well as the acts of its
employees or agents who have explicit or implied consent to place bids. I agree that all vehicles are sold "as is" without
warranties as to the extent of the damage, description or title. Moreover, I understand that the purchased vehicle must be
picked up within 5 days from the sale day; otherwise, the business will be held responsible for storage expenses. In the event     101
that a vehicle is not picked up within 10 working days after the day of the sale, it will be relisted at the bidder's cost. The
relisting cost is $150.00 per vehicle. The bidder will also be liable for any other charges associated with the noncompletion of
the transaction, such as collection and/or legal expenses. The business understands its obligation to satisfy any and all fees in
accordance with the terms and conditions of AutoSalvageBid.com. I agree to abide by such terms and conditions. I further
agree
that the information provided on this application is truthful and it will be supplemented as necessary. By signing
this document, I acknowledge that I read and understood its content.

[            ]    [            ]    [            ]    [            ]
  Signature          Print Name         Job Title            Date

Figure 39

Auto Salvage Bid.com

[Logo] [Help]

[Welcome] [Sell Your Vehicle] [Sales List] [Search & Bid] [Walk the Line] [Vehicle/Part Locator] [Auction Schedule] [Auction Watch]

Confirm your bid and watch the clock!

| Photo of the vehicle | Auction starts at 10:18AM On 2/7/2000 | Bid Value: 5200  Increment: 100 |
|---|---|---|
| | Lot Number 12345 | |
| | Year 1995  Make Honda  Model Accord | Confirm Bid |

| Time Remaining: 1:28:07 | Total Bids: 32 | Top Three Bids: 1. __  2. __  3. __ | Messages appear here, such as: "You are the winning bidder!" "You did not make the top ten list" or "You are the highest bidder, but did not meet the minimum bid" |
|---|---|---|---|
| Note: The time remaining clock is reset to two minutes when there is a new high bid. | | | |

| Photo of the vehicle | Auction starts at 10:30AM On 2/7/2000 | Bid Value: 4300  Increment: 100 |
|---|---|---|
| | Lot Number 12346 | |
| | Year 1992  Make Toyota  Model Camry | Confirm Bid |

| Time Remaining: 1:46:06 | Total Bids: 15 | Top Three Bids: 1. 4150  2. 3900  3. 3850 | Messages appear here, such as: "You are the winning bidder!" "You did not make the top ten list" or "You are the highest bidder, but did not meet the minimum bid" |
|---|---|---|---|
| Note: The time remaining clock is reset to two minutes when there is a new high bid. | | | |

Note: This screen reflects that two lot numbers were entered in the simultaneous bidding screen.

Figure 40

Auto Salvage Bid.com

Logo | Help

[ Welcome ] [ Sell Your Vehicle ] [ Sales List ] [ Search & Bid ] [ Walk the Line ] [ Vehicle/Part Locator ] [ Auction Schedule ] [ Auction Watch ]

Your Selling History
January 1, 2000 to December 31, 2000

| Damage Type | Lot # | YR | Make | Model | Body | Mileage | Sale Date | Sale Price |
|---|---|---|---|---|---|---|---|---|
| Burned Interior | 12345 | 99 | Honda | Accord | 4-DR | 100,000 | 2/5/2000 | $4,600 |
| Roll Over | 12346 | 94 | Toyota | Camry | 2-DR | 150,000 | 3/7/2000 | $4,150 |
| 15 spaces | 5 spaces | 2 | 5 spaces | 10 spaces | 4 spaces | 8 spaces | 8 spaces | 8 spaces |

Logo Auto Salvage Bid.com [ Help ]

[ Welcome ] [ Sell Your Vehicle ] [ Sales List ] [ Search & Bid ] [ Walk the Line ] [ Vehicle/Part Locator ] [ Auction Schedule ] [ Auction Watch ]

Your Buying History
January 1, 2000 to December 31, 2000

| Damage Type | Lot # | YR | Make | Model | Body | Mileage | Purchase Date | Purchase Price |
|---|---|---|---|---|---|---|---|---|
| Burned Interior | 12345 | 99 | Honda | Accord | 4-DR | 100,000 | 2/5/2000 | $4,600 |
| Roll Over | 12346 | 94 | Toyota | Camry | 2-DR | 150,000 | 3/7/2000 | $4,150 |
| 15 spaces | 5 spaces | 2 | 5 spaces | 10 spaces | 4 spaces | 8 spaces | 8 spaces | 8 spaces |

Logo Auto Salvage Bid.com [Help]

[Welcome] [Sell Your Vehicle] [Sales List] [Search & Bid] [Walk the Line] [Vehicle/Part Locator] [Auction Schedule] [Auction Watch]

Auction History Sales Lists
The last two auctions for each state will be listed

Connecticut
- 2/5/2000
- 3/10/2000

Massachusetts
- 2/10/2000
- 3/22/2000

New Hampshire
- 2/2/2000
- 3/2/2000

Rhode Island
- 3/3/2000
- 4/15/2000

Logo Auto Salvage Bid.com [ Help ]

[ Welcome ] [ Sell Your Vehicle ] [ Sales List ] [ Search & Bid ] [ Walk the Line ] [ Vehicle/Part Locator ] [ Auction Schedule ] [ Auction Watch ]

Auction History Sales List
For
Connecticut
2/5/2000

| Damage Type | Lot # | YR | Make | Model | Body | Mileage | State/Title | Sale Price |
|---|---|---|---|---|---|---|---|---|
| Burned Interior | 12345 | 99 | Honda | Accord | 4-DR | 100,000 | CT-Clean | $4,600 |
| Roll Over | 12346 | 94 | Toyota | Camry | 2-DR | 150,000 | CT-Clean | $4,150 |
| 15 spaces | 5 spaces | 2 | 5 spaces | 10 spaces | 4 spaces | 8 spaces | 27 spaces | 8 spaces |

Logo  Auto Salvage Bid.com  Member Log On | Help

| Welcome | Sell Your Vehicle | Sales List | Search & Bid | Walk the Line | Vehicle/Part Locator | Auction Schedule | Auction Watch |

*Lot Number 10001*

| Photo-Left Front | Photo-Right Front | Photo-Right Rear | Photo-Left Rear |
| Photo-Front Interior | Photo-Rear Interior | Photo-Engine Compartment | 15 Second Video of the Engine Starting |

1 Location — City / State / Zip Code    9 V.I.N. — Vehicle Identification Number
2 Auction Date & Time — Date / Time    10 Retail Value Complete
3 Year, Make & Model — Year / Make / Model    11 Title Type
4 Color — color Interior color    12 Damage
5 Engine — Description / Cylinders    13 Delivery Available
6 Transmission — Type    14 Distance to Vehicle
7 Drive — 2-wheel, 4 wheel, etc.    15 Additional Info.
8 Mileage

[ Place Bid ]    [ Automated Bid ]
115

Note: This page is referred to as the "Detailed Information/Photographs Page"

FIG. 45

Auto Salvage Bid.com

Vehicle Damage Descriptions

1. All Over
2. Burned Engine
3. Burned Interior
4. Burned All Over
5. Chemical Spill
6. Drive Train
7. Driver's Side
8. Engine Damage
9. Flood/Salt
10. Flood/Fresh
11. Flood
12. Front End
13. Left Front
14. None Visible
15. Passenger Side
16. Rear End
17. Right Front
18. Roll Over
19. Roof
20. Undercarriage
21. Vandalism

INTERACTIVE VEHICLE AUCTION AND SALE SYSTEM

CROSS REFERENCE TO RELATED APPLICATIONS

This application claims the benefit in the form of a continuation-in-part under 37 C.F.R. 1.53(b)(1) of currently pending parent application, Ser. No. 09/649,876 filed Aug. 28, 2000 now abandoned, by the same inventor.

FIELD OF THE INVENTION

This invention relates generally to vehicle auctions and specifically to vehicle auctions augmented by the use of computer systems and networks. More specifically, the invention relates to the auctioning of automobiles between people or business entities accessing the auction system via personal computers or network based terminals.

Due to the success of auctions, some in the motor vehicle industry have attempted to bring the idea of the automobile auction into the realm of modem technology by utilizing the internet and personal computers to establish online auctioning systems. In order to shorten the auction process, prior art online auction systems set time limits on the actual auction. In these prior art auction processes, the time limits are established before the auction begins and the bidder is often hurried and thus may not receive the full advantage of the auction process.

Also, in many prior art auction systems, vehicles are posted for a two, three or even a four week time period. This extended posting and bidding process forces the bidder to check back with the auction site day after day to find out whether they have been outbid.

What is needed is a system that will allow the user a reasonable amount of time to decide on whether or not to bid and yet control the overall length of time for which an auction may exist. Another attribute needed in the online auction system hinges around allowing users or especially automobile dealers to actively place their vehicles into the auction process.

SUMMARY OF THE INVENTION

The present invention allows a person with access to a computer to participate in an active automobile auction. The system employs internet connections, along with servers and databases, in order to allow the user the choice of either participating directly in the auction, as it occurs, or submitting a maximum and a starting bid preceding the auction and allowing the system to notify the user of the results.

In comparison with the prior art systems, the present invention realizes innovations in the auction process such as establishing an auction timer, which is designed to reset once a bid higher in value than the highest bid on record is placed. This timer thus regulates the overall amount of time an auction will last, while allowing a user a reasonable amount of time to best a prior bid. Using the auction schedule feature, in combination with the timer system, a user can place bids prior to the auction and also become involved in the active auction process. Thus by utilizing the present invention, a busy professional user may also attend the auction at a designated time and bid quickly. This leaves the user the flexibility and the time to bid on other vehicles being auctioned simultaneously.

Another innovation of the present invention simulates the actual process of choosing a vehicle from an automobile sales lot by establishing the "Walk the Line" function.

In addition to those innovations, the present invention allows users to enter their vehicle into the sales or auctioning realm through an interactive menu called "Selling Your Vehicle."

Finally, the present invention also allows the user the chance to see and hear the vehicle perform upon engine start up.

BRIEF DESCRIPTION OF THE DRAWINGS

FIG. 1.1 is a depiction of the Top Ten Bids List as it will appear to the user.

FIG. 19 shows the Welcome page for the web site, as it appears upon access by a user, arrived at via the Internet.

FIG. 20 shows the screen entitled "Sell Your Vehicle" for the web site, as it appears upon access by a user, arrived at via the Internet.

FIG. 22 shows the second of the Sales List screens for the web site, as it appears upon access by a user, arrived at via the Internet.

FIG. 23 shows the third of the Sales List screens for the web site, as it appears upon access by a user, arrived at via the Internet.

FIG. 24 shows the fourth of the Sales List screens for the web site, as it appears upon access by a user, arrived at via the Internet.

FIG. 25 shows the first Search and Bid screen for the web site, as it appears upon access by a user, arrived at via the Internet.

FIG. 27 shows the third Search and Bid screen for the web site, as it appears upon access by a user, arrived at via the Internet.

FIG. 28 shows the Bid screen for the web site, as it appears upon access by a user, arrived at via the Internet.

FIG. 29 shows the third Confirm Bid screen for the web site, as it appears upon access by a user, arrived at via the Internet.

FIG. 30 shows the Walk the Line screen for the web site, as it appears upon access by a user, arrived at via the Internet.

FIG. 31 shows the first Vehicle/Part Locator screen for the web site, as it appears upon access by a user, arrived at via the Internet.

FIG. 32 shows the Auction Schedule screen for the web site, as it appears upon access by a user, arrived at via the Internet.

FIG. 34 shows the second Auction Watch screen for the web site, as it appears upon access by a user, arrived at via the Internet.

FIG. 35 shows the Bidder Registration form screen for the web site, as it appears upon access by a user, arrived at via the Internet.

FIG. 39 shows the second Confirm Your Bid screen for the web site, as it appears upon access by a user, arrived at via the Internet.

FIG. 40 shows the Your Selling History screen for the web site, as it appears upon access by a user, arrived at via the Internet.

FIG. 41 shows the Your Buying History screen for the web site, as it appears upon access by a user, arrived at via the Internet.

FIG. 42 shows the Auction History Sales List screen for the web site, as it appears upon access by a user, arrived at via the Internet.

FIG. 43 is an example output box a user would receive by making a selection from the Auction History Sales List screen for the web site, as it appears upon access by a user, arrived at via the Internet.

FIG. 44 shows the Information/Photographs Page screen for the web site, as it appears upon access by a user, arrived at via the Internet.

FIG. 45 shows the Damage Descriptions screen for the web site, as it appears upon access by a user, arrived at via the Internet.

DETAILED DESCRIPTION OF THE PREFERRED EMBODIMENTS

As described above, FIG. 1 through FIG. 16 give a data base view of the routing of the software and the sequencing of the screens for the user interface when a selection is made from the Main Menu. The user interface screens will be discussed in detail in FIG. 18 through FIG. 45.

Figure 17:
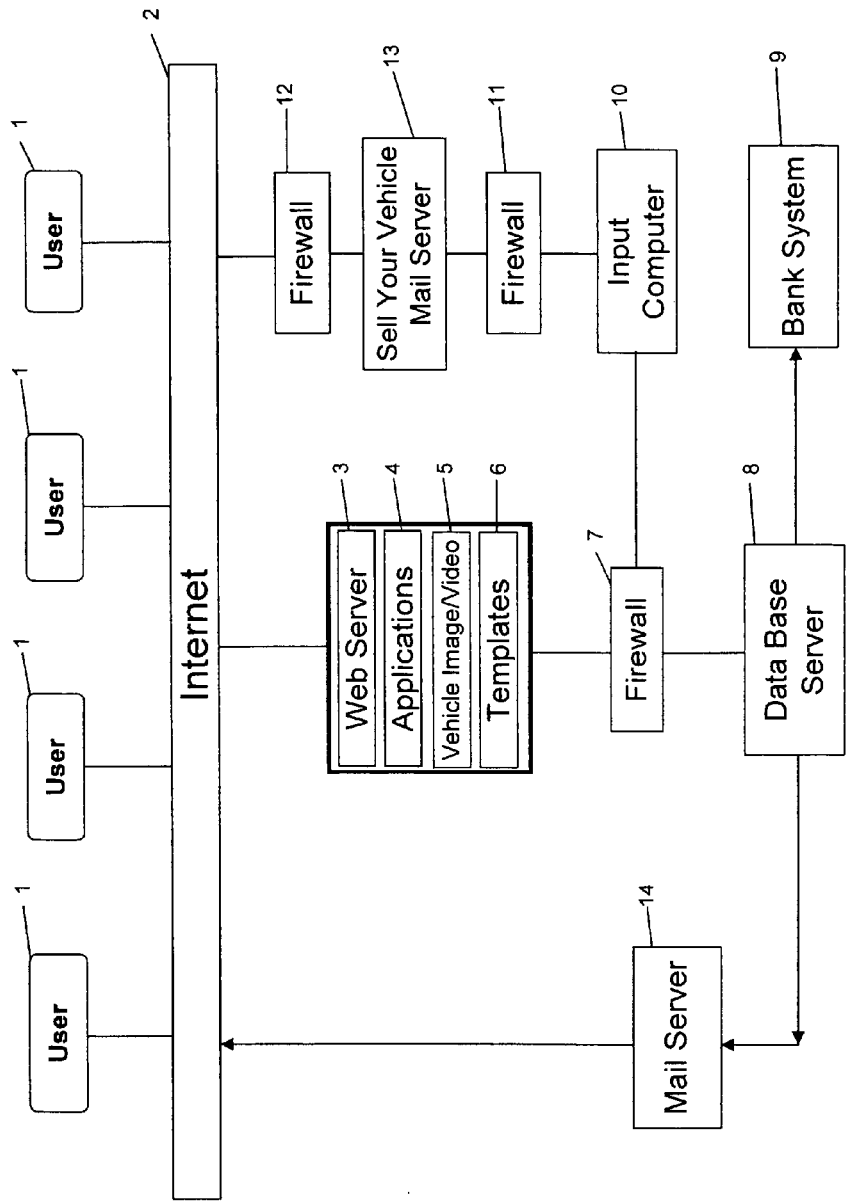
FIG. 17 is a graphic representation of the system hardware configuration, illustrating the network and user access terminals.

FIG. 17 is an overview of the hardware components utilized in operating the system. A plurality of computers are networked and provided access to a plurality of database servers along with a plurality of mail servers via Internet connections. A plurality of users located at User terminals 1, are connected to the auction system via separate Internet 2 connections. The connection via the Internet 2 allows the users to gain access to the web server 3. The Web Server 3 "houses" the system and allows the user to operate the system in a real time capacity. Housed with the web server 3 are the Applications 4, Vehicle/Video 5, and Template servers 6, which provide support to the array of screens employed by the web site and the digital images of the vehicles presented for sale or auction.

In order to actively purchase or bid upon a vehicle, the user must have access to the Database Server 8. This server, like all servers in the system, acquires scrutiny from unwanted access through a plurality of protection mechanisms called Firewalls. Database Server 8 is protected by a Firewall 7 and access in to the Database Server 8 cannot be gained without providing certain information, prompted for when a user attempts to register as a user for the first time. In much the same manner, the Sell Your Vehicle Mail Server 13, and the Input Computer 10 are protected by Firewall 12 and Firewall 11 respectively. These firewalls prevent the user from damaging or unrightfully accessing the information retained on these servers.

The Sell Your Vehicle Mail Server 13 allows registered, as well as unregistered users, to input information regarding a vehicle they would like to put up for sale or auction. The vehicle information is then routed to the Input Computer 10 to be applied to the Database Server 8 to be utilized for future sales and auctions.

The Database Server Firewall 7 also protects the Input Computer 10 and the Bank System 9 from unauthorized access. The Bank System 9 allows the user to make payment on-line with a credit card or bank card.

Once attached to the Web Server 3, a registered user can access the full complement of screens and sell, purchase, or partake in an active auctioning process upon a vehicle. Once a user selects a vehicle to purchase or presents the winning bid in an auction, the user receives an e-mail from the Mail Server 14. The user will then be informed that his purchase has been approved through the Bank System 9.

Figure 18:
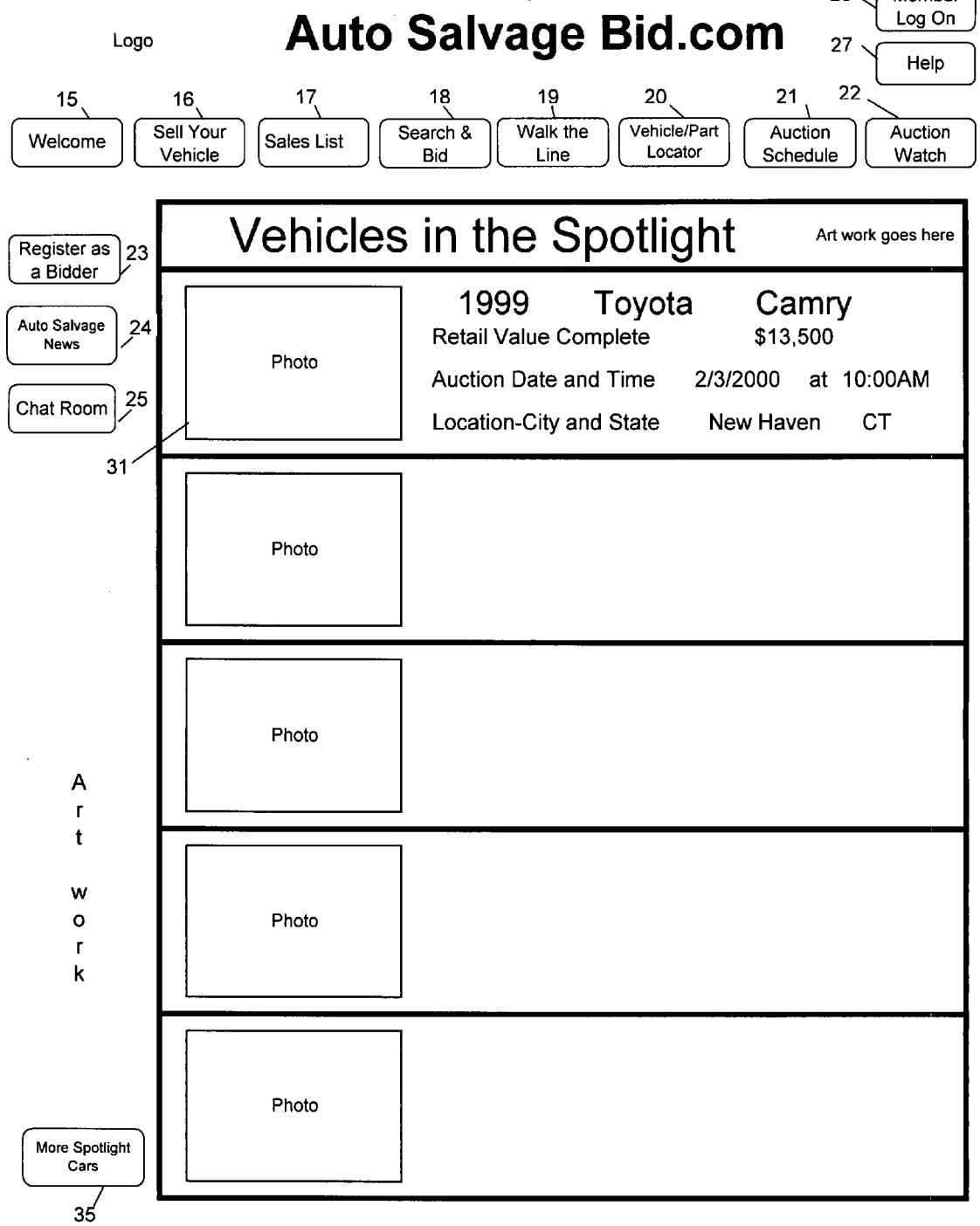
FIG. 18 shows the Main Menu and Front Page for the web site, as it appears upon access by a user, arrived at via the Internet.

FIG. 18 shows the Main Menu and Front Page for the web site, as it appears upon access by a user, arrived at via the Internet. This page serves as the control center screen and main menu for the sales and auctioning system. This screen allots the user eight main function buttons, fourteen selectable option buttons in total, with which to operate the system. These buttons trigger different facets of the web site and allow the client to interact with the web site. The main function buttons are located across the top of the main menu screen (listed 15-26).

The Welcome button 15 relays the user to the Welcome page, (FIG. 19), which is designed to orient the user and inform the user of the features offered by the web site, and the auctioning system specifically. The Sell Your Vehicle button 16 leads the user to the screen entitled "Sell Your Vehicle" (FIG. 20). As will be discussed, this screen acts a preliminary step to gather information about a vehicle before heading to the vehicle's location for photographs and allows users to enter their vehicle into the sales and auction process.

Figure 21:
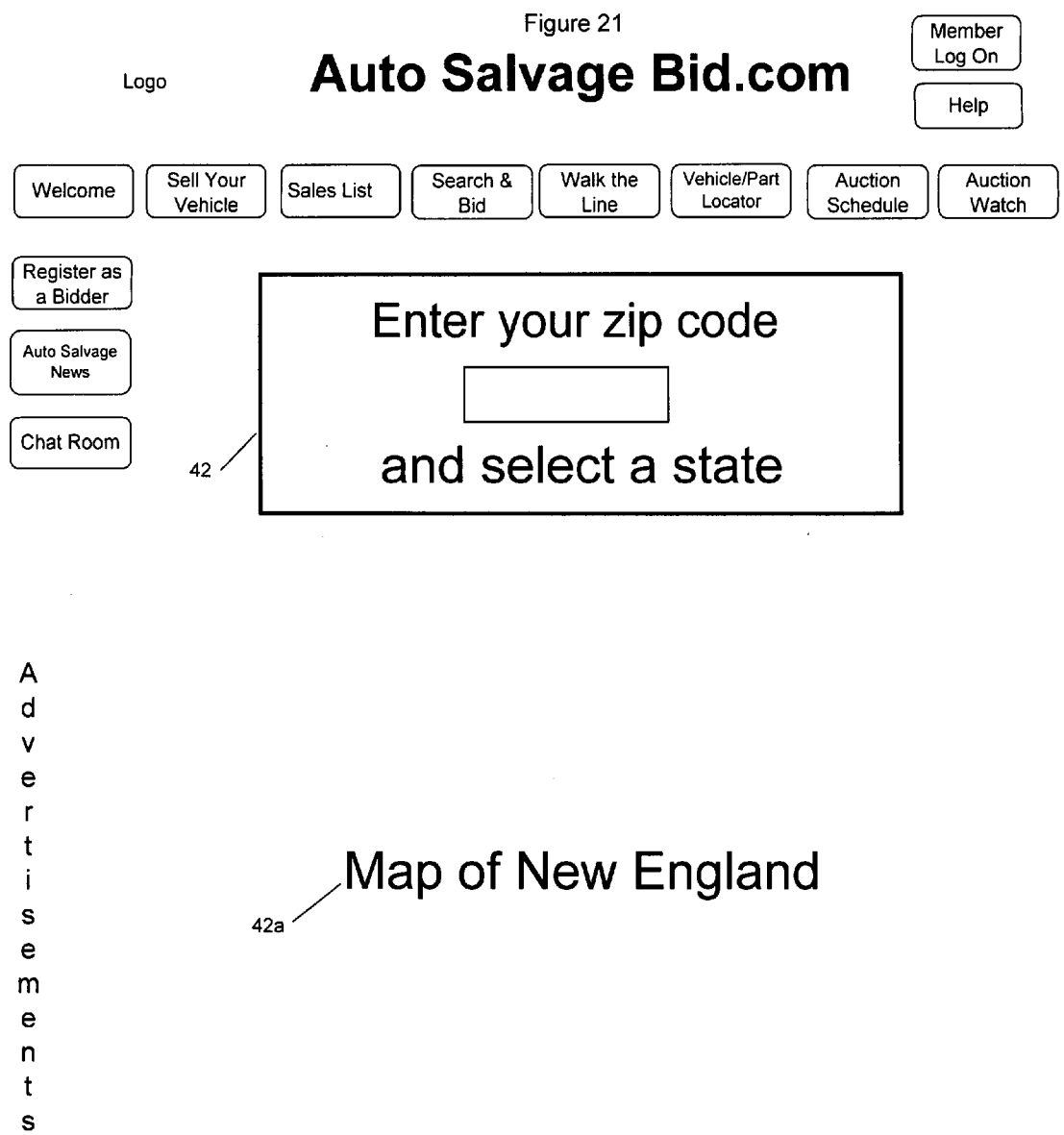
FIG. 21 shows the first of the Sales List screens for the web site, as it appears upon access by a user, arrived at via the Internet.

Selecting the Sales List button 17 leads the user to the first of the Sales List screens (FIG. 21). As will be discussed, this screen and the Sales List screens that follow it (FIGS. 22-24) allow a user to choose a region and be provided with the list of auctions in that region including dates and times.

Depressing the Search and Bid button 18 will lead the user to a screen which walks the user through a series of steps (FIGS. 25-27), the motivation for which is to search for a certain make, model, and year of vehicle as specified by the user.

The next available button, the Walk the Line button 19, leads the user to the Walk the Line screen, which gives the user a side by side visual display of the cars available at each auction (FIG. 30). The Vehicle/Part Locator button 20 allows the user to utilize the Search capabilities of the system to scan the databases in order to acquire names of dealers of certain types of vehicles, within proximity of the user. This provides the output shown in FIG. 31.

By accessing the Auction Schedule button 21 the user is led to a series of calendar based screens, each of which displays a certain month and the auctions occurring on each specific day of that month (FIG. 32).

Figure 33:
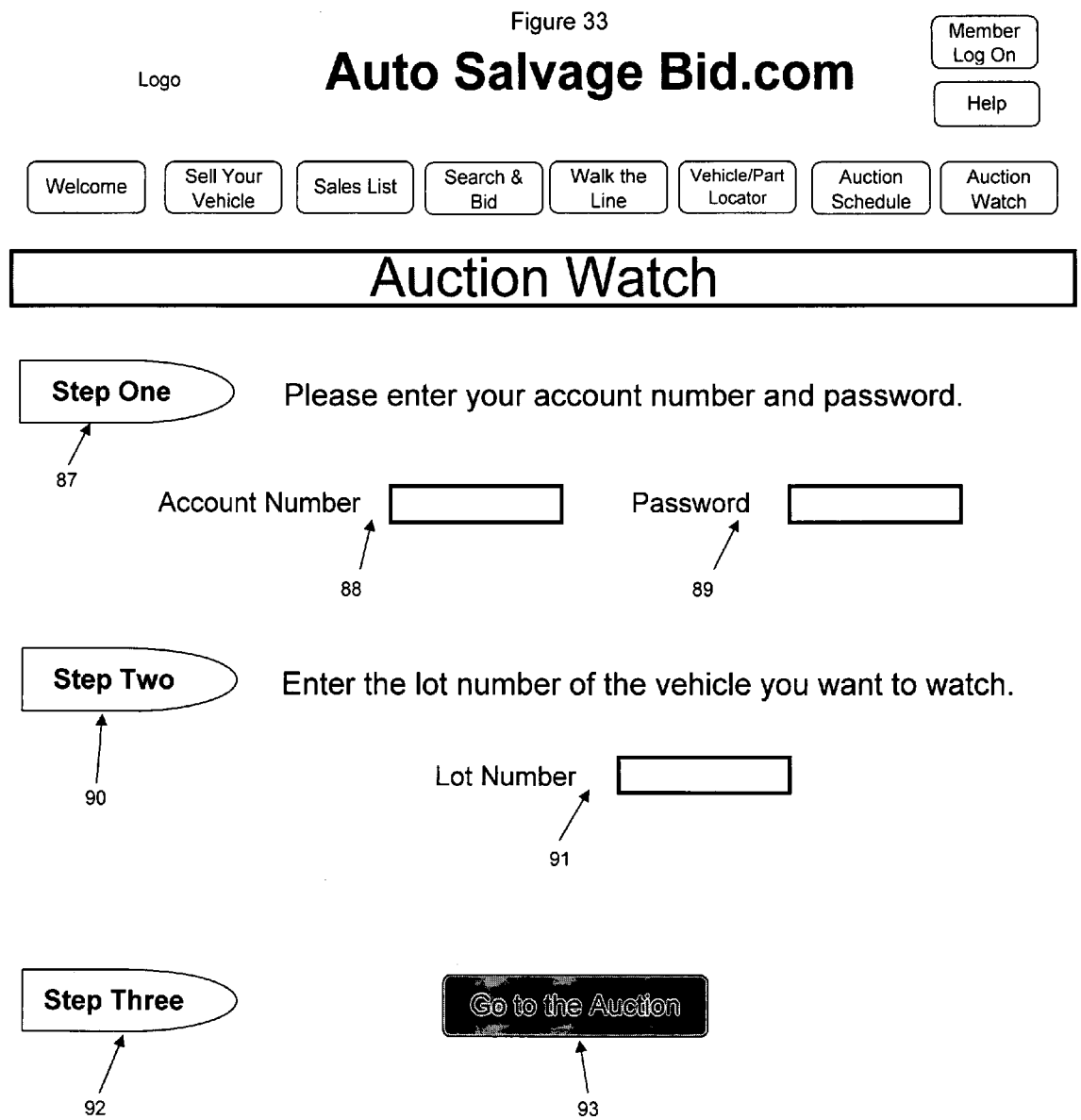
FIG. 33 shows the first Auction Watch screen for the web site, as it appears upon access by a user, arrived at via the Internet.

The final button listed among the eight main options is the Auction Watch button 22, which relays the user to the Auction Watch screen (FIGS. 33-34). This function allows a user with an existing account to choose a specific auction in progress and view the bidding process as it occurs.

Along the side of the main menu screen are positioned three more buttons, (23-25). The Register As A Bidder button 23, once accessed, leads to a Bidder Registration form (FIG. 35). On this form, the prospective bidder is allotted spaces to provide the needed information to get clearance for usage of the bidding process.

Located directly below the Register As A Bidder button 23 is the Auto Salvage News button 24. Accessing this portion of the system brings the user to a regularly updated newsletter which reports on the happenings within the Auto Salvage system. Located directly below this button is the Chat Room button 25. This button leads the user into an environment where free discussion regarding the site, the vehicles, and other such topics may occur.

Moving to the very top of the main menu, the user may access the Member Log On button 26. This button allows registered users to access their account and begin bidding quickly by leading the user through a series of short menus (FIGS. 36-43). Positioned below the Member Log On button 26 is the Help button 27. This button provides the user with answers regarding using and managing the system when questions arise.

Occupying a major portion of the Main Menu screen (FIG. 18) is the Vehicle in the Spotlight Board 28. This Board acts as a regularly updated advertiser for the sale and auction of vehicles. A plurality of vehicles are listed with pertinent information regarding each vehicle contained on the board, along with an electronic image of the vehicles. Each vehicle is given a listing of the year 29, make and model 30, and a digital photograph 31 of the respective vehicle. Along with the above information, a listed retail price 32, the sale date and time 33, and the location 34 of the vehicle is listed.

Located in the lower left hand corner of the main menu screen (FIG. 18), the final feature of the screen, the More Spotlight Cars button 35, enables the user to access additional vehicles chosen to be listed in the Vehicles in the Spotlight 28 section.

As stated above, the Sell Your Vehicle button 16 on the Main Menu (FIG. 18) leads the user to FIG. 20. This screen provides the user with a three-step system for placing the user's vehicle into the auction or sales process. Step 1, Background Information 36 provides a prior user with an account number space 37 to enter his account number. If the user is accessing the system for the first time, user information box 38 is provided.

The user is next guided to Step 2, Vehicle Information 39. In this step, boxes are provided for the user to enter specific information regarding the vehicle he wishes to put into the sale or auction process. After filling in the vehicle information, the user is led to Step 3, Submit Your Request 40. From here, the user need only press the SUBMIT button 41, and the vehicle is entered into the process. The submission triggers a response that will inform the user of the submission and output the message "Your request has been submitted. A representative will call you shortly to schedule an appointment."

Selecting the Sales List button 17 from the Main Menu (FIG. 18) leads the user to the first of three Sales List screens (FIG. 21). The Sales List screens (FIGS. 21-23) provide the user with a regional breakdown of vehicles to bid. The zip code box 42 prompts the user to enter his zip code and select a state. A map 42a of the states covered for vehicle bidding, located below the zip code box 42, is displayed. The user may choose any of the states by pressing one of the state initial buttons. When a state initial button is clicked on, the entire alphabetized list of vehicles from the next auction date and time will appear as FIG. 22.

The Second Sales List screen (FIG. 22) provides the user with an information box 43 on all vehicles in the user chosen field of vehicles. The vehicle information includes damage type, lot number, year, make, model, body, mileage, state/title, distance to the car. The distance to the car 44 feature calculates the distance from the location of the user to the location of the vehicle using the provided network and databases, and subsequently displays this information to the user.

Several sets of vehicles available at different time increments may be viewed from the Second Sales List screen (FIG. 22). When a user clicks on the Lot Number, the user is directed to the Third Sales List screen (FIG. 23), which displays a photograph gallery 45 of a particular vehicle selected and generates information on each of the specific vehicles in the information box 46. The photographic gallery 45 supplies the user with different views of the vehicle interior and exterior, the vehicle engine and gives the user the choice of viewing a 15 second video of the engine during its start up. The vehicles are listed with either an "A" or a "P" classification trailing the automobile statistics in Sales List screen (FIG. 22). The "A" denotes that the vehicle will be sold at auction and the "P" denotes that the vehicle will be sold for a fixed price. The user will be routed to the appropriate sale or auction screen depending on how the individual vehicle chosen is classified. When a user chooses a vehicle classified in the "P" category, the user is routed to Third Sales List screen (FIG. 23).

When the user chooses an individual picture from the photograph gallery 45, the picture becomes enlarged and gives the user a clearer visual of the vehicle. The boxes contained in the photograph gallery 45 contain electronic images of the vehicle, showcasing the vehicle engine, a panoramic view of the vehicle exterior, the vehicle interior, and a fifteen second video image and audio of the engine upon starting the vehicle. The Purchase Vehicle button 47 is located below the information box. Selecting this button leads the user to the Fourth Sales List screen, (FIG. 24).

The Fourth Sales List screen displays the vehicle price 48 and allows the user to confirm the purchase 49. The Third and Fourth Sales List screens also serve the Search and Bid function 18 and the Walk the Line function 19. Thus, this screen becomes the default screen for all bidding evolutions.

Figure 26:
FIG. 26 shows the second Search and Bid screen for the web site, as it appears upon access by a user, arrived at via the Internet.

The First Search and Bid screen, arrived at by pressing the Search and Bid button 18 on the Main Menu (FIG. 18), is illustrated in FIG. 25. The screen displays STEP 1 50 which prompts the user to choose a make of vehicle and provides an alphabetically arranged scrolling vehicle list 51 from which to choose a vehicle make. Once the user has chosen the appropriate make of vehicle, the user can then depress the GO button 52 which will guide the user Second Search and Bid screen (FIG. 26).

In the uppermost section of this screen, STEP 2 53 will be displayed. STEP 2 53 prompts the user to choose a model of vehicle and provides an alphabetically arranged scrolling vehicle list 54 and the make box which reflects the make already chosen in STEP 1 50.

Next on the screen is STEP 3 55, which prompts the user to choose a starting and ending date year for the desired vehicle from the scrolling year BEGIN box 56 and END box 57 respectively.

Once this selection is complete, the user moves on to STEP 4 58 which asks for the user's zip code in the ZIP CODE box 59. The system uses this information to calculate the distance from the user to the available vehicle or lot of vehicles. Once the user has completed the steps on this screen, the user can depress the GO button 60, which routes to user to the Third Search and Bid screen (FIG. 27).

The Third Search and Bid screen (FIG. 27) provides results for the search entered by the user. The upper most part of the screen contains a Search Results box 61, which displays the range of years, make and model for the search vehicles. Below this, the search results will be displayed, beginning with the vehicle lot located the closest to the user, and descending to the lot located furthest from the user. The Third Search and Bid screen (FIG. 27) will utilize the Sales List function to display the read out in the format of the Second Sales List screen (FIG. 22). The Second Sales List screen (FIG. 22) format will be appended to the Third Search and Bid screen (FIG. 27) in the Read Out box 62 provided in the midsection of the screen.

In the lower most portion of the Third Search and Bid screen (FIG. 27) is the Number of Items Found box 63. This box displays the number of vehicle lots found by the search database. Positioned below this is the New Search button 64. By choosing this button, the user returns to the beginning of the search process and may begin searching for a different genre of vehicle.

Once the user selects a lot number from the search results screen, the user will be routed to the Detailed Information/Photographs page. Depending on whether the vehicle is listed under a fixed price, ("P") or Auction, ("A"), the category, a purchase vehicle (FIG. 23) or place bid/auto bid (FIG. 44) screen will appear respectively. The photographs are electronic images of the vehicles.

In FIG. 44, when the user selects the Automated Bid button 115, the user will be routed to FIG. 28, which acts as a non-dynamic auctioning mechanism. The user is shown information and a photograph of the vehicle in the information box 65. The user may then enter his maximum bid value 66 and minimum bid value 67. The bid increment box 68 gives a bid increment for that vehicle, in the specific price ranges of bidding. The user may then press the submit auto bid button 69 to submit these values. The values are then stored in the database until the auction occurs and then administered into the auction proceedings, all without the need for user involvement.

If the user chooses, he may still actively participate in the auction using the Confirm Bid screen (FIG. 29). This screen gives the user a series of information regarding the active auction. The time remaining on the timer 70, total number of bids 71, and the top ten bids 72 are listed in the respective boxes. The timer 70 starts at 2:00 minutes and counts down until a new bid that is greater than the bid in field one is put forth. If there are no bids greater than the value in field one, then the clock runs to zero. If a bid higher than the bid in field one is entered, the timer then resets at 4 minutes, 2 minutes, 1 minute and this evolution occurs until the timer 70 runs out. There is an undisclosed minimum bid set by the seller. If this figure is not met, the effect will be a message to the high bidder that they did not meet the minimum bid and an Auto Salvage Bid representative will contact the individual bidder shortly. The user can actively enter new bids in the bid value box 73. The increment box 74 functions as a drop down menu, which gives the bidder the ability to increment his bid quickly rather than retype the bid. The message box 75 keeps the user updated on his position in the bidding process with written messages.

FIG. 30 displays the Walk the Line screen. The Walk the Line box 76, which informs the user that he is on the Walk the Line page. The Walk the Line feature gives the bidder a sense of what vehicle auctions are occurring on a given day. This function enables the user to act quickly in bidding upon a vehicle of interest, while still keeping the user abreast of subsequent vehicles in auction that specific day. Multiple vehicles may be bid upon simultaneously by a single user and complete lots of vehicles can be held up for auction simultaneously. In the preferred evolution, lots containing three (3) vehicles will be auctioned off every six (6) minutes.

Directly below the Walk the Line box 76 is the first display date and time box 77. This box informs the user of the date and time when the corresponding vehicles in this display will go on auction. Below this box are vehicle display boxes 78 for the individual vehicles to be auctioned at the corresponding date and time above. Each box includes the year, make and model of the vehicle along with a digital photograph of the vehicle. Once the total vehicles for a certain date and time have been displayed, the next date and time of vehicle auction is listed along with the corresponding vehicle display boxes. This function gives the user the feel of browsing a vehicle auction, while allowing the user to decide upon which vehicles he may bid. The user can access a large number of vehicles in this manner as all the auctions for an arbitrary period of time may be listed on ensuing pages and the user may access these pages using the scrolling mechanism 79 on the right hand side of the page.

FIG. 31 shows the First Vehicle/Part Locator screen. The vehicle part locator operates in the same manner as the Search and Bid function. The Vehicle/Part Locator function follows the same 4-step process as the Search and Bid function, in that Vehicle/Part Locator prompts the user to enter a make, model, range of years for vehicle and user zip code, moving through identical screens as the Search and Bid. The Vehicle/Part Locator then searches the databases for former auction lists to arrive at dealer addresses and outputs this information, via the Vehicle/Part Locator Search Results screen (FIG. 31). A photograph of the vehicle 80, along with a description and location of the vehicle, the distance the vehicle is located from the user and the sale date of the vehicle are shown for each vehicle listed. In this manner, the user may discover the whereabouts of the vehicles for his corresponding part.

The Auction Schedule screen is shown in FIG. 32. The schedule is displayed in one month per screen format with the present month showing as the default. Located in upper most right hand corner is the NEXT MONTH button 81 and LAST MONTH button 82 which allows the user to scroll through the subsequent and proceeding months respectively. Below the next month button 81 is the month indicator 83, which keeps the user abreast of what month is being accessed.

In the midsection of the Auction Schedule screen is the calendar 84 for the month listed above. The calendar is divided into day blocks 85, on each day block, the states 86 holding auctions on that day are listed.

The First Auction Watch screen is shown in FIG. 33. This feature provides quick access to users who are already registered in the system. STEP 1 87 prompts the user to fill in the ACCOUNT NUMBER 88 and PASSWORD 89 boxes. STEP 2 90 prompts the user to fill in the LOT NUMBER 91 he wishes to view the bidding on. STEP 3 92 contains the GO TO AUCTION button 93. Depressing this button leads the user to the Second Auction Watch screen (FIG. 34).

Figure 1:
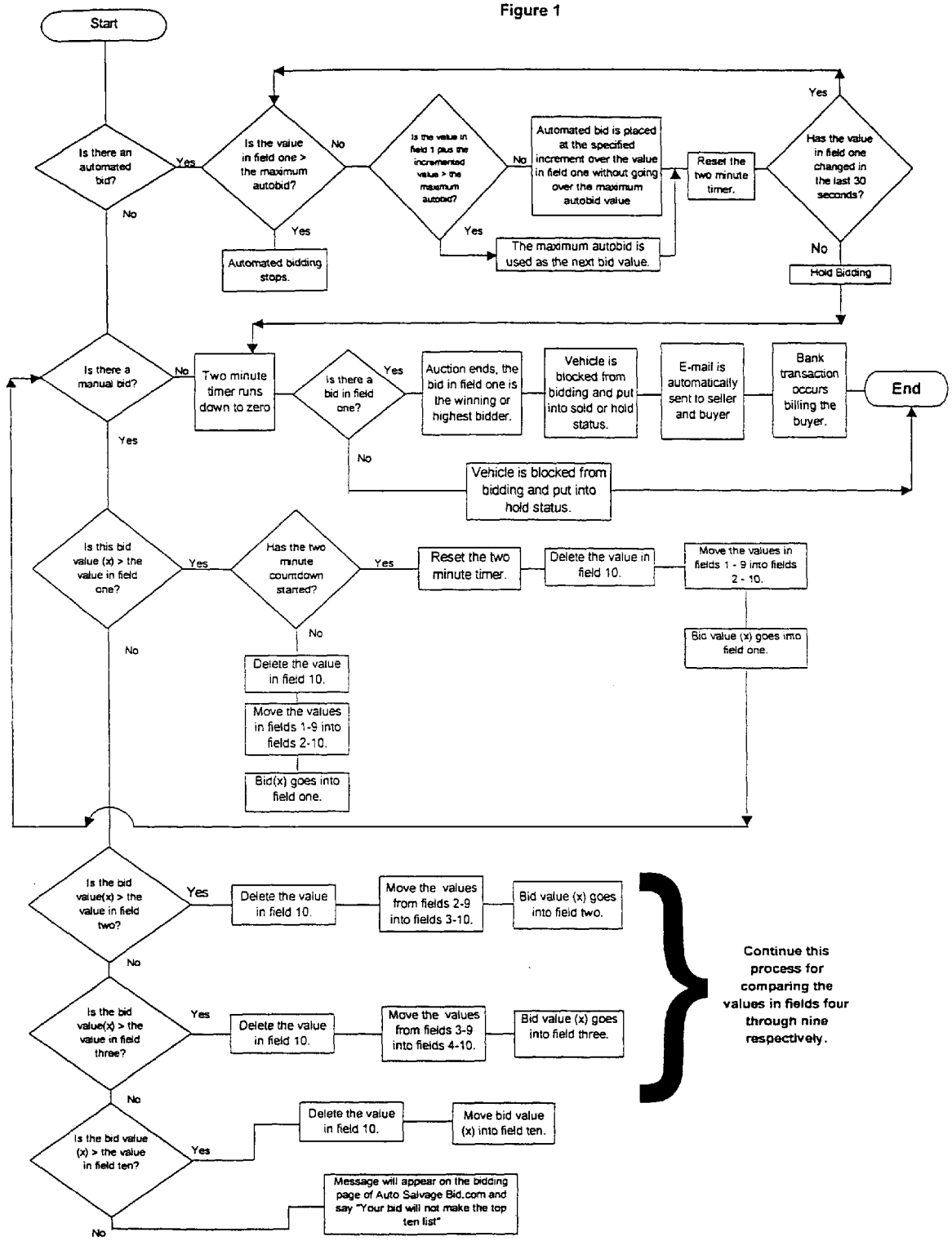
FIG. 1 is a flowchart of the Bidding Process including the routing of the reset timer system.
Figure 2:
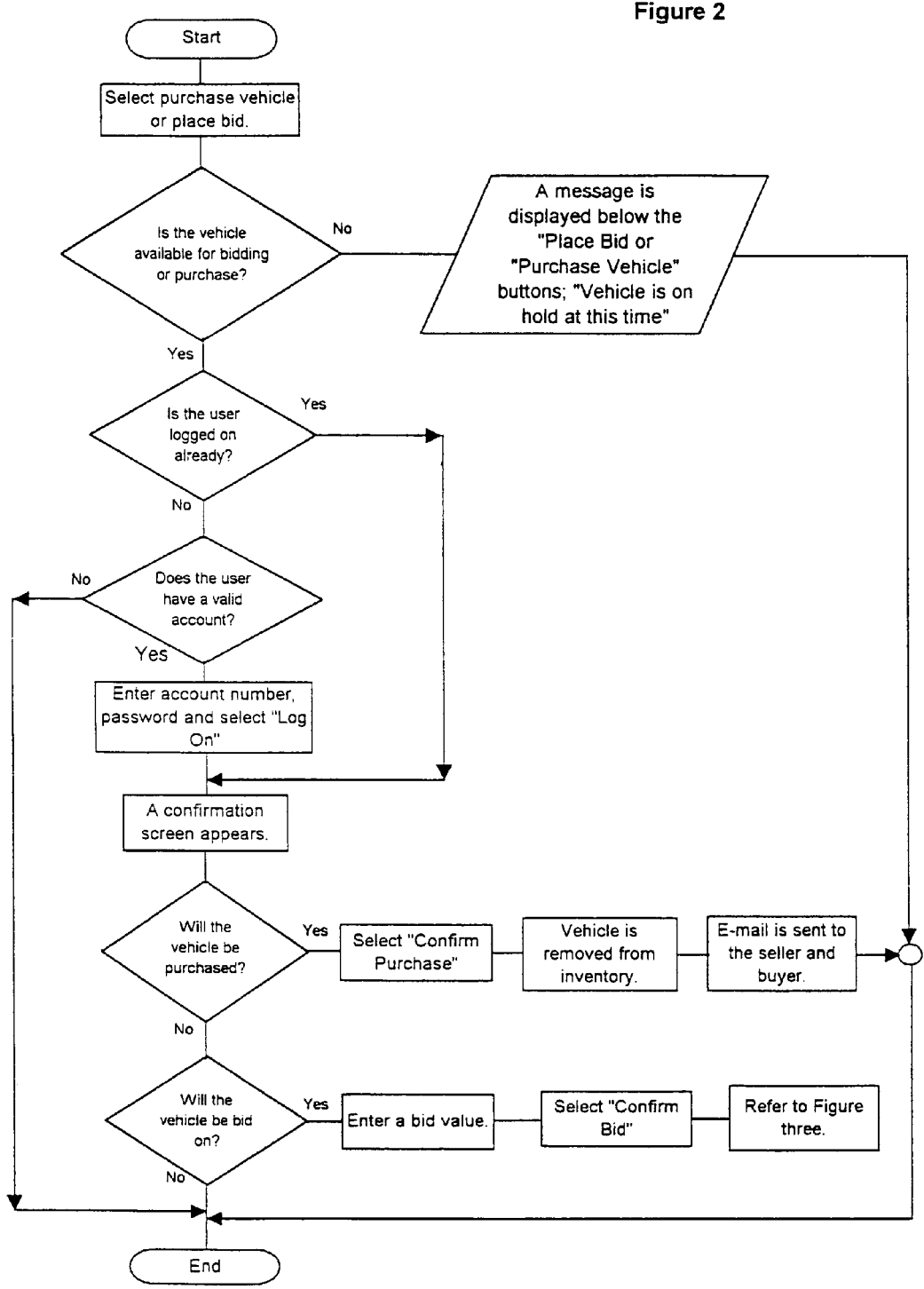
FIG. 2 is a flowchart of the interrelation between the bidding process and the vehicle purchasing process, illustrating the routing of the software upon user choices.
Figure 3:
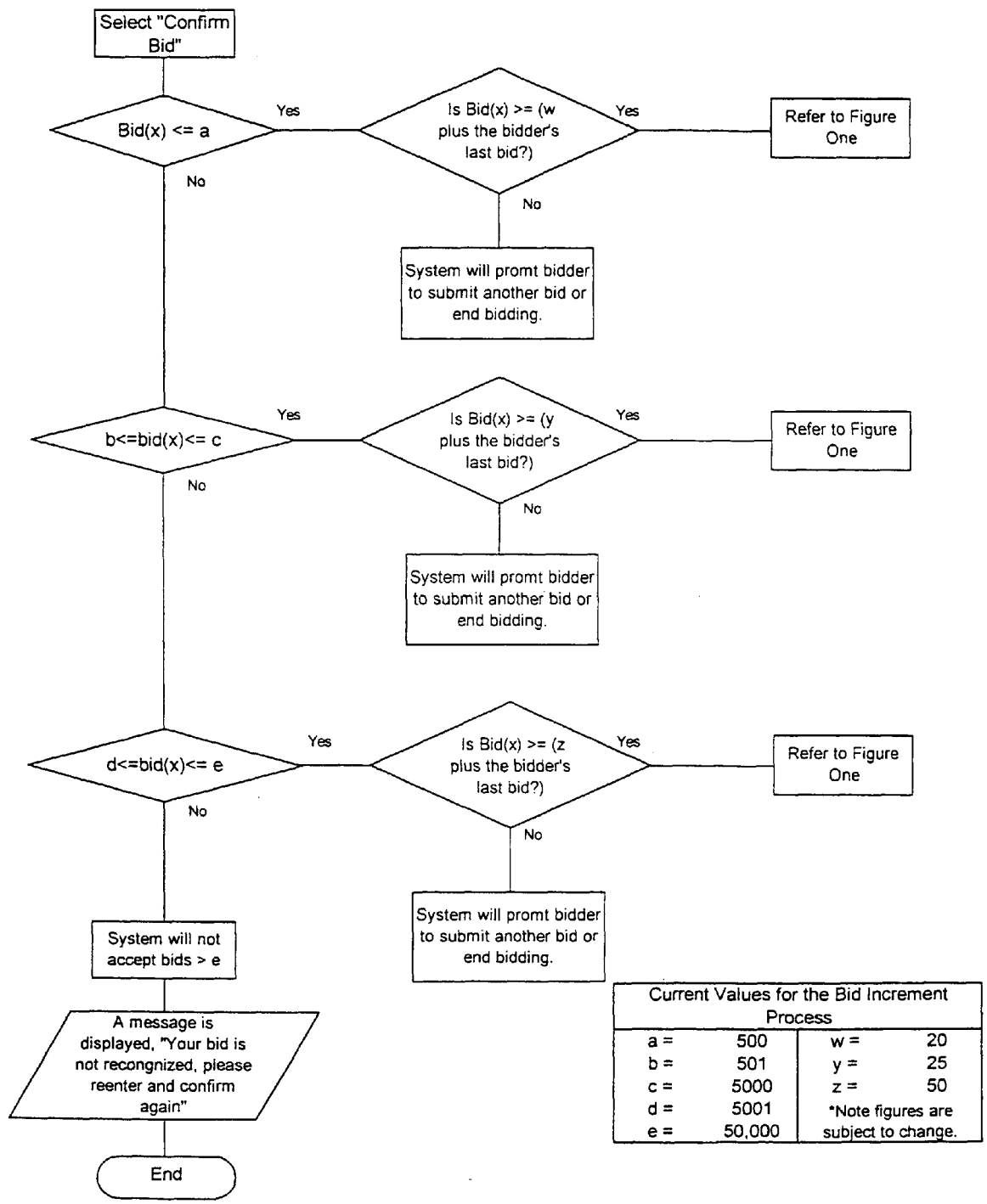
FIG. 3 is a flowchart showing the routing of the bidding system as the bids are monitored by the allowable increment and the maximum automatic-bid.
Figure 4:
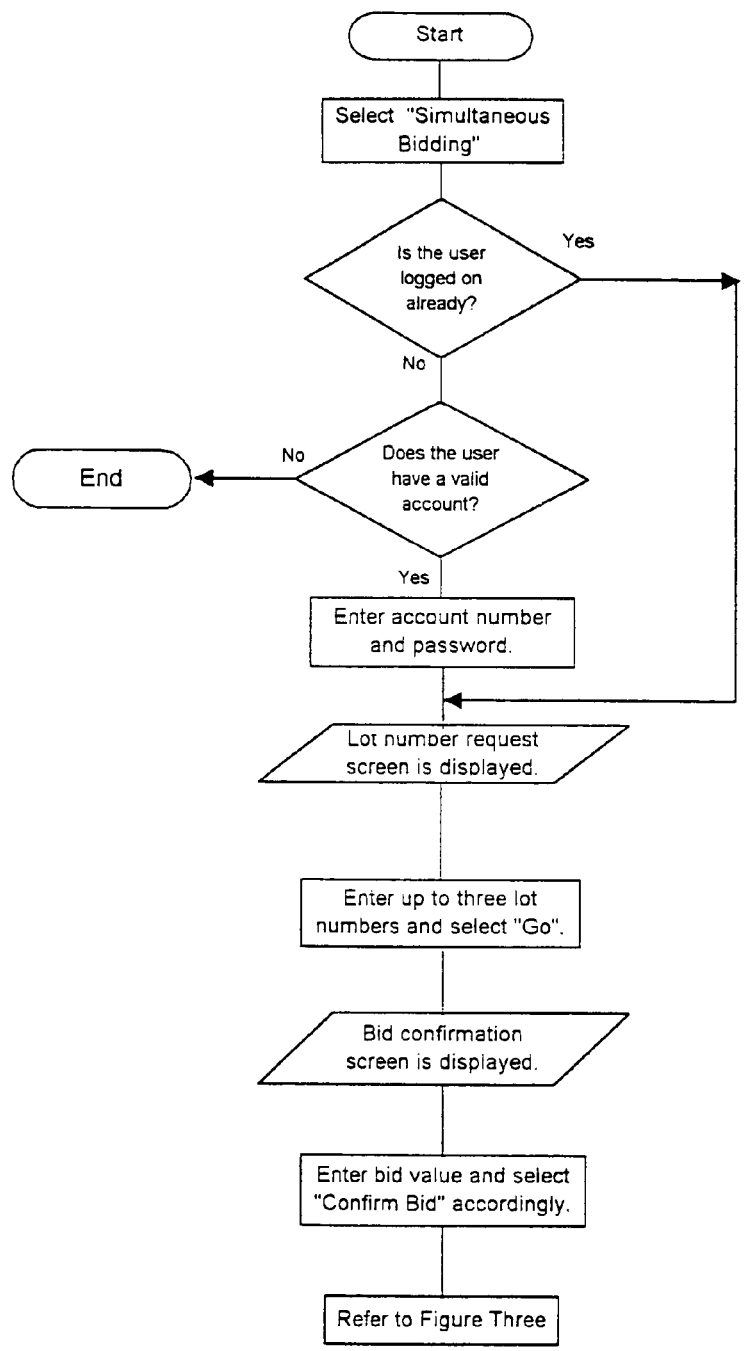
FIG. 4 is a flowchart showing the routing of the software that occurs during simultaneous bidding.
Figure 5:
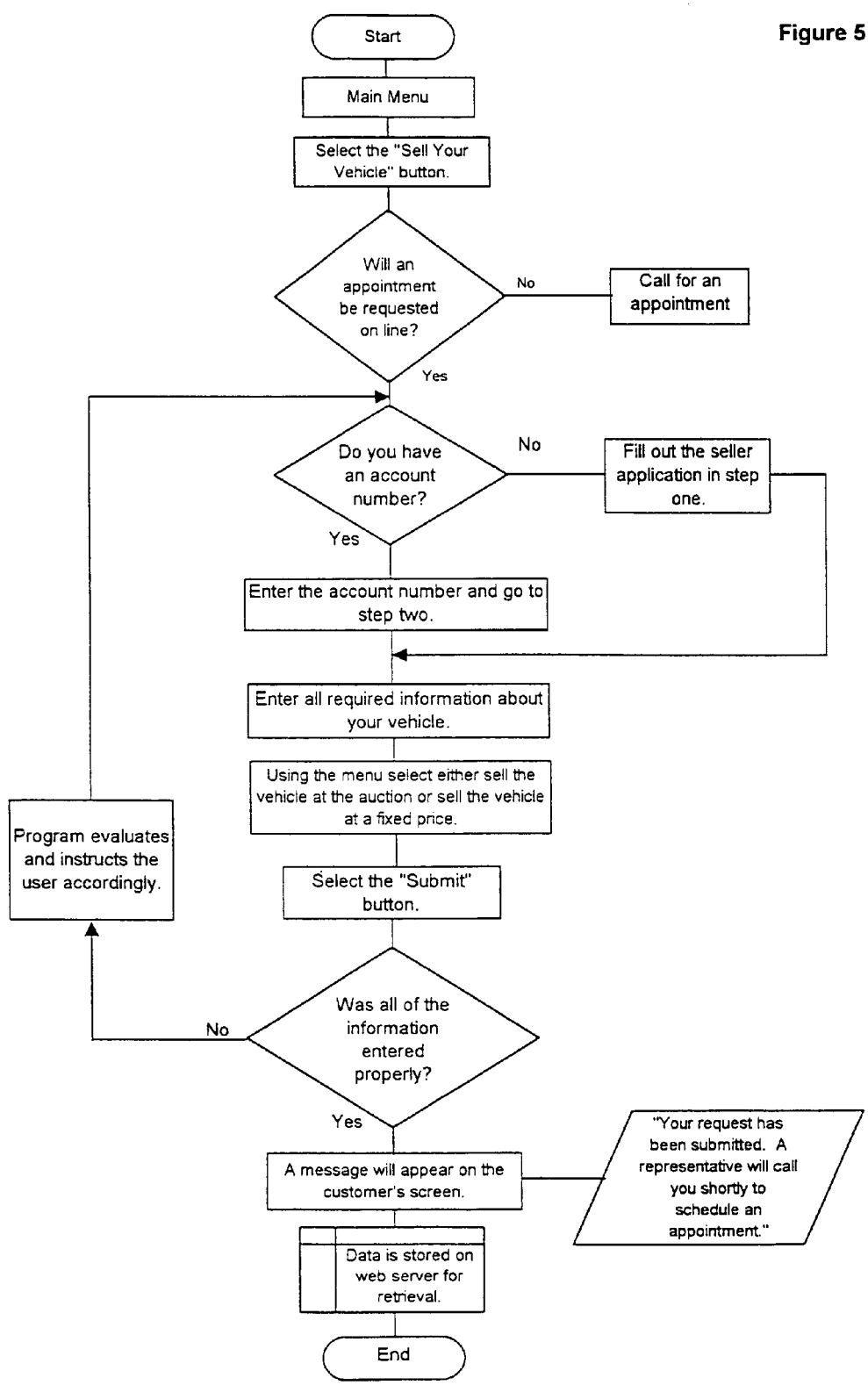
FIG. 5 is a flowchart of the routing of the software and the screens a user encounters when selecting the "Sell Your Vehicle" option.
Figure 6:
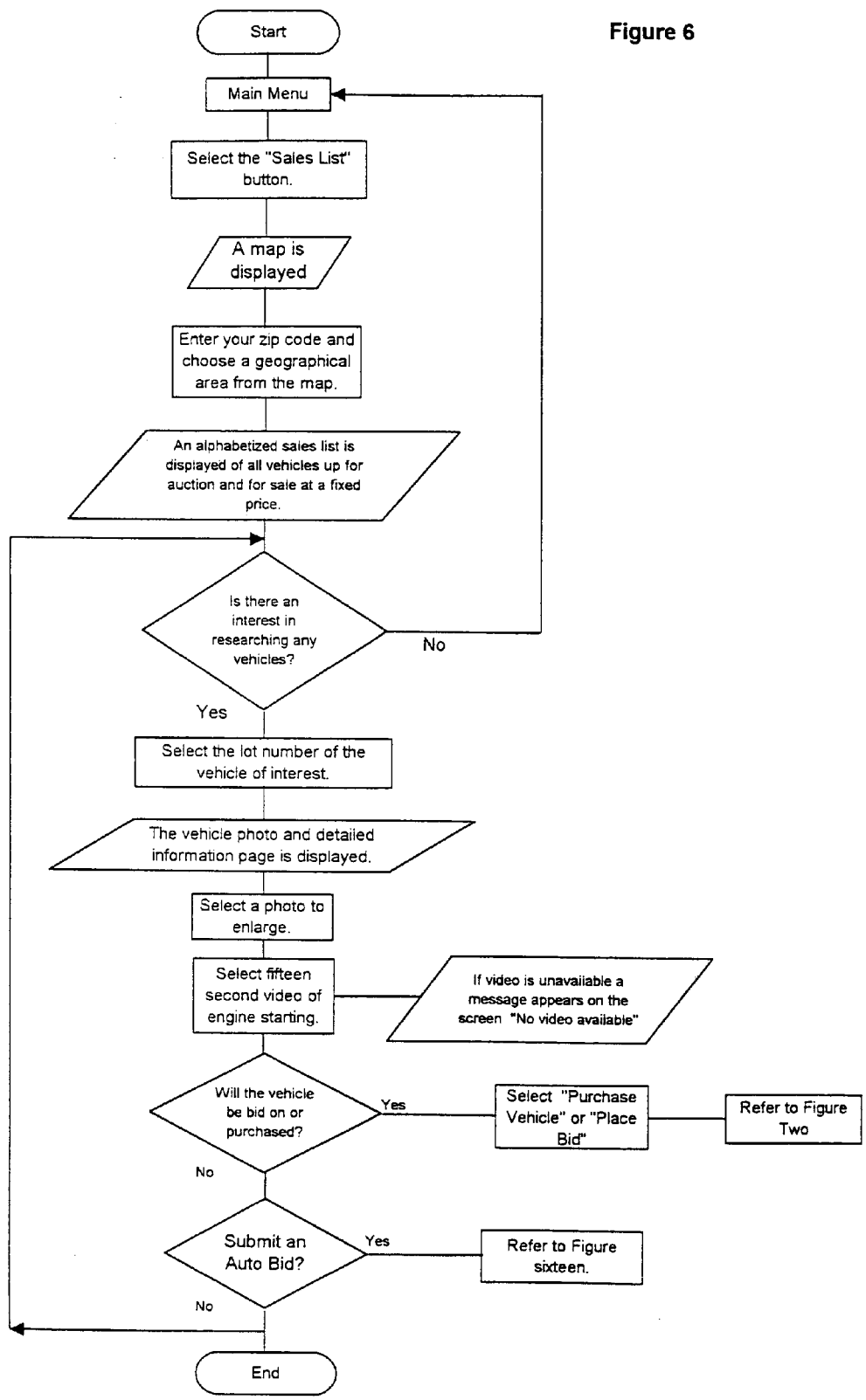
FIG. 6 is a flowchart of the routing of the software and the screens a user encounters when depressing the "Sales List" button on the Main Menu.
Figure 7:
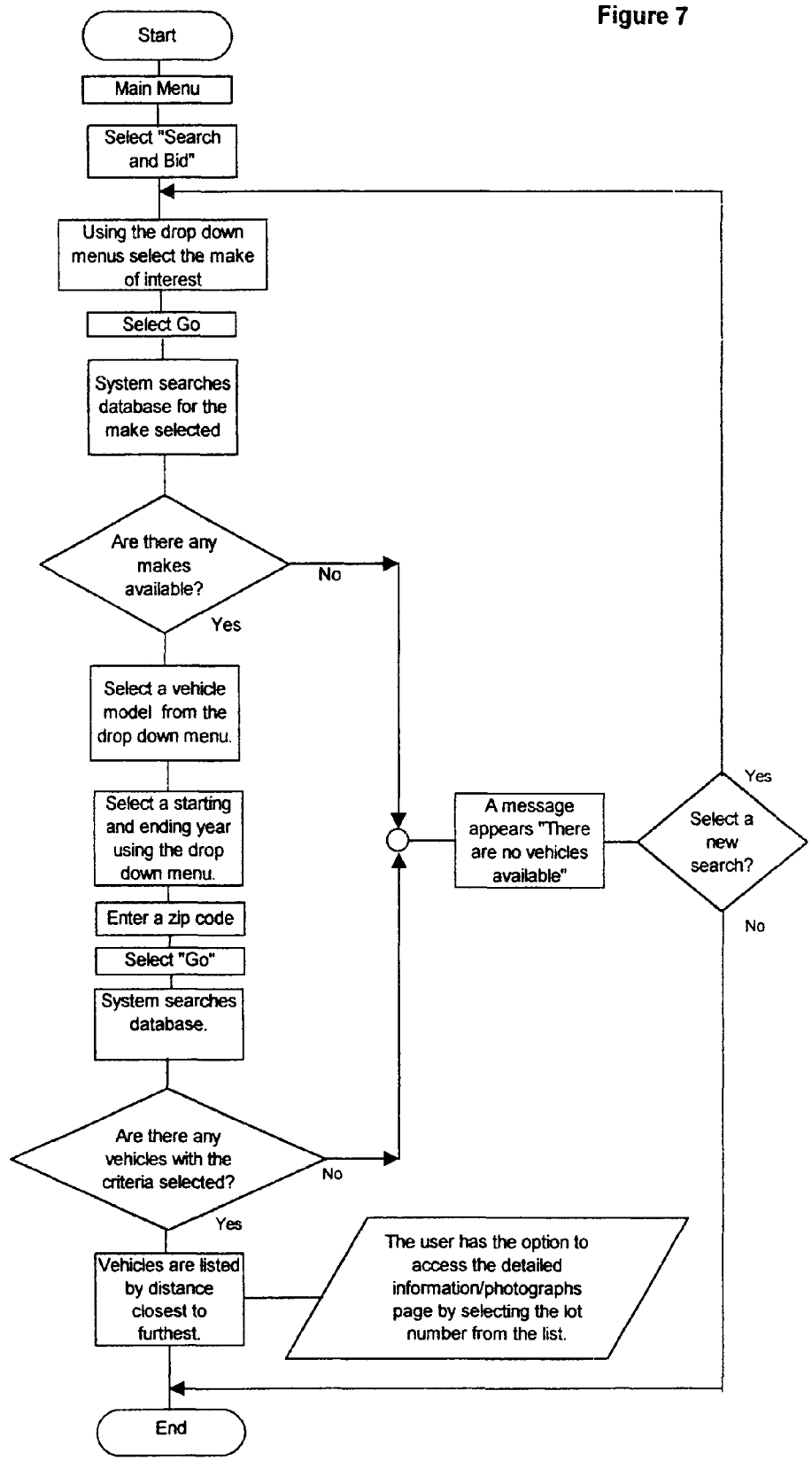
FIG. 7 is a flowchart of the routing of the software and the screens a user encounters when depressing the "Search and Bid" button on the Main Menu.
Figure 8:
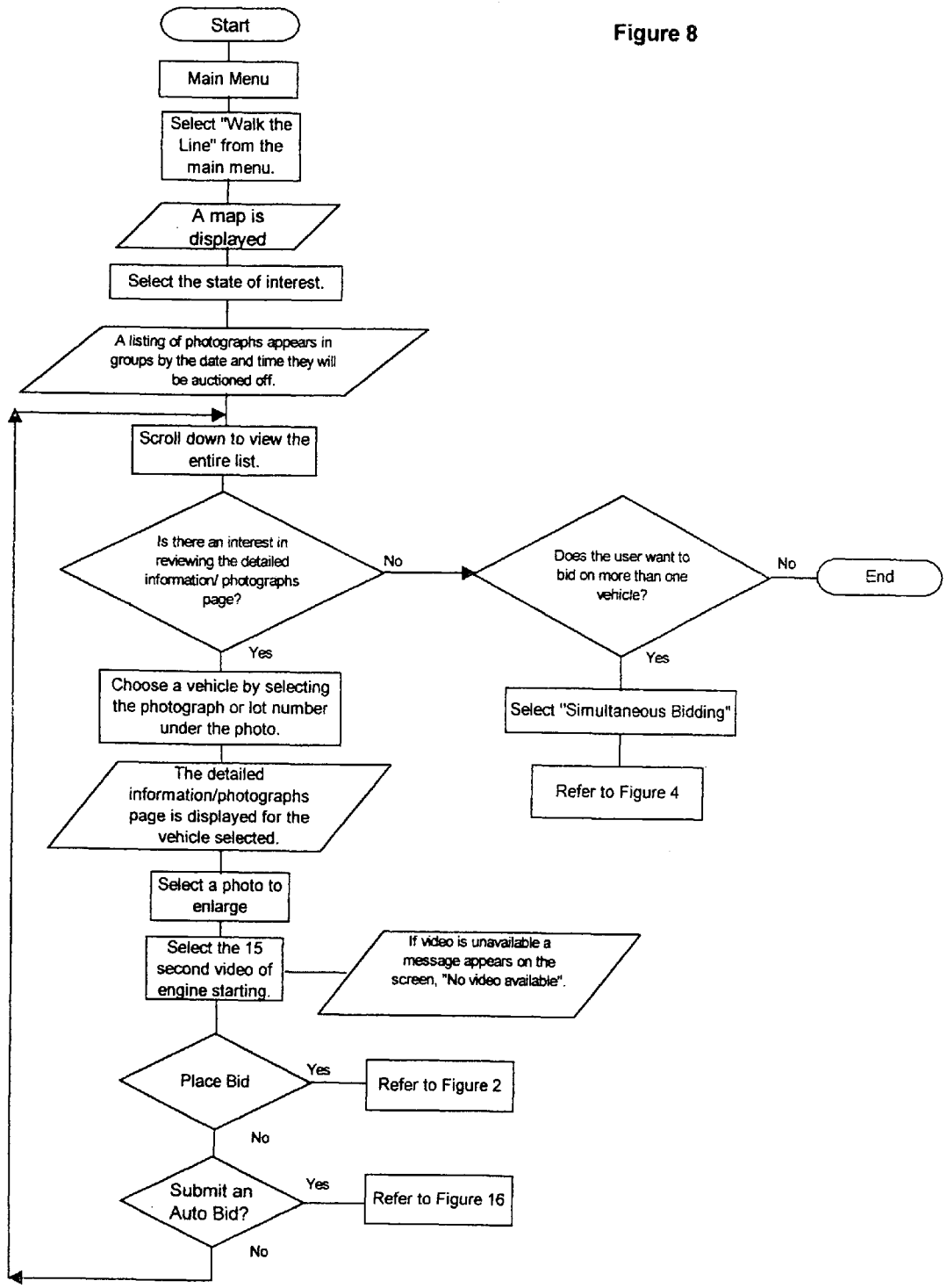
FIG. 8 is a flowchart of the routing of the software and the screens a user encounters when depressing the "Walk the Line" button on the Main Menu.
Figure 9:
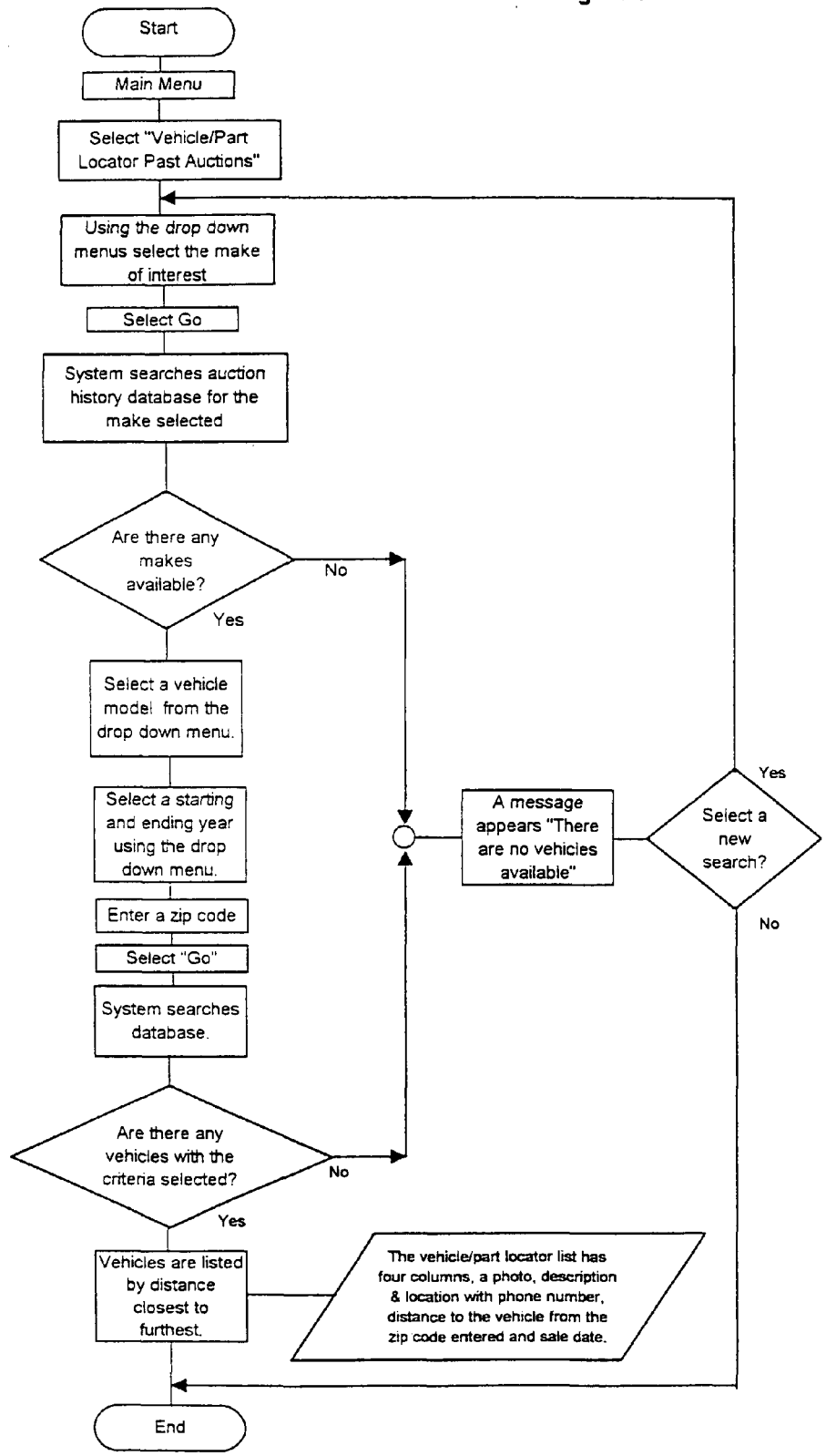
FIG. 9 is a flowchart of the routing of the software and the screens a user encounters when depressing the "Vehicle/Part Locator" button on the Main Menu.
Figure 10:
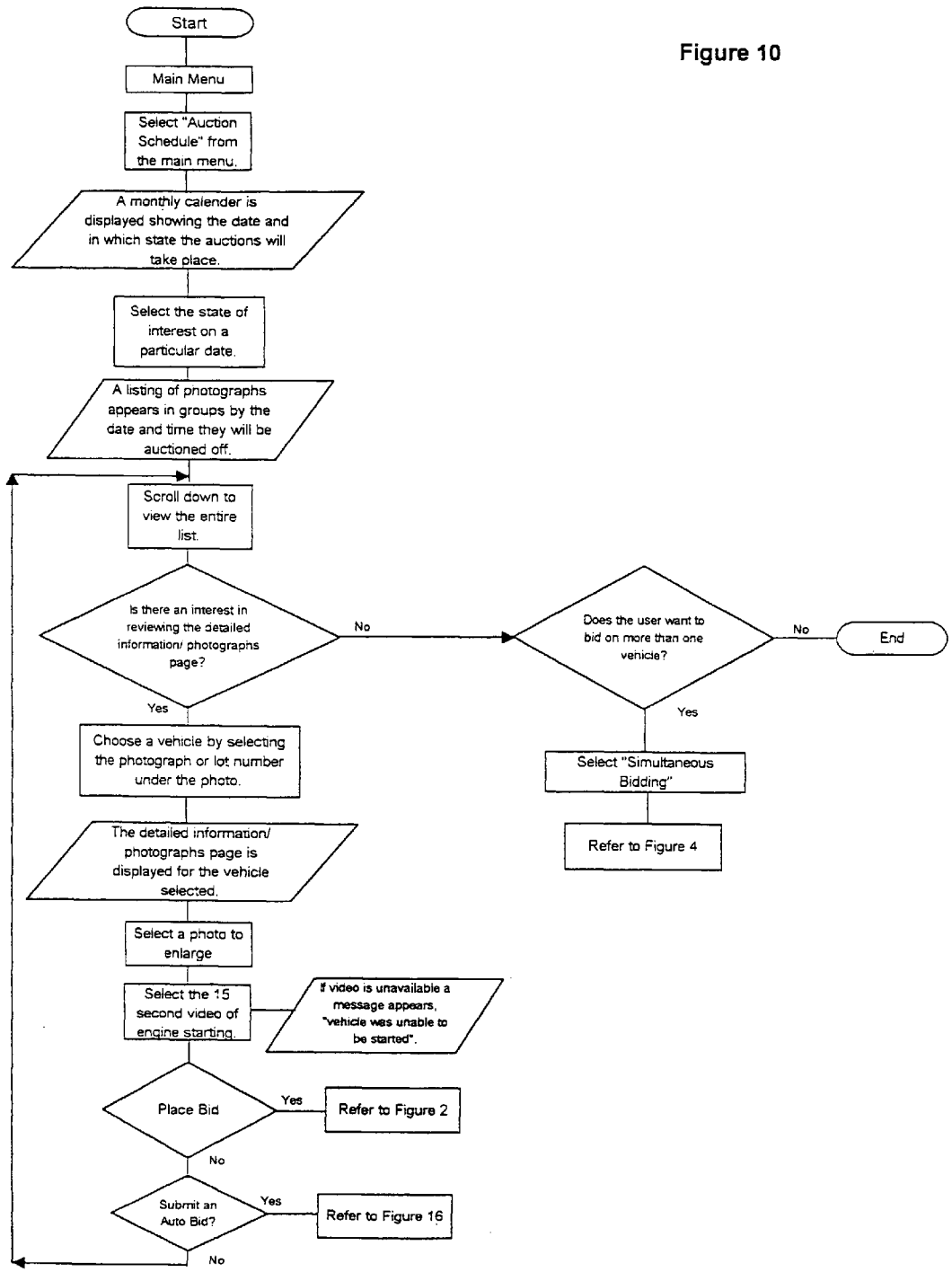
FIG. 10 is a flowchart of the routing of the software and the screens a user encounters and the routing involved when depressing the "Auction Schedule" button on the Main Menu.
Figure 11:
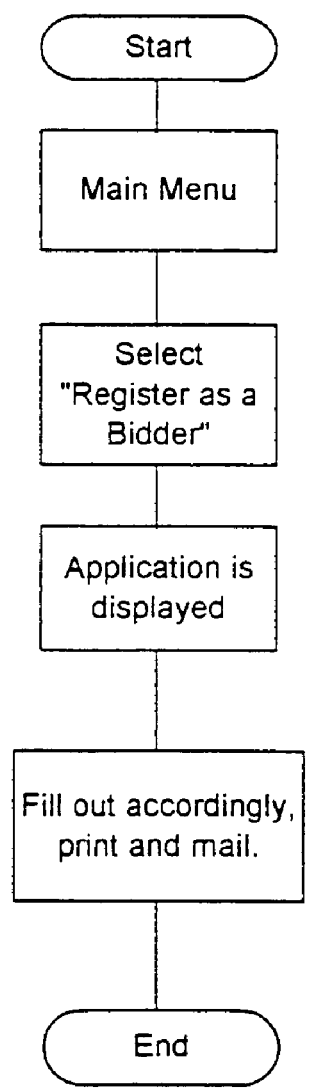
FIG. 11 is a flowchart of the routing of the software and the screens a user encounters when the user selects the "Register as a Bidder" button on the Main Menu.
Figure 12:
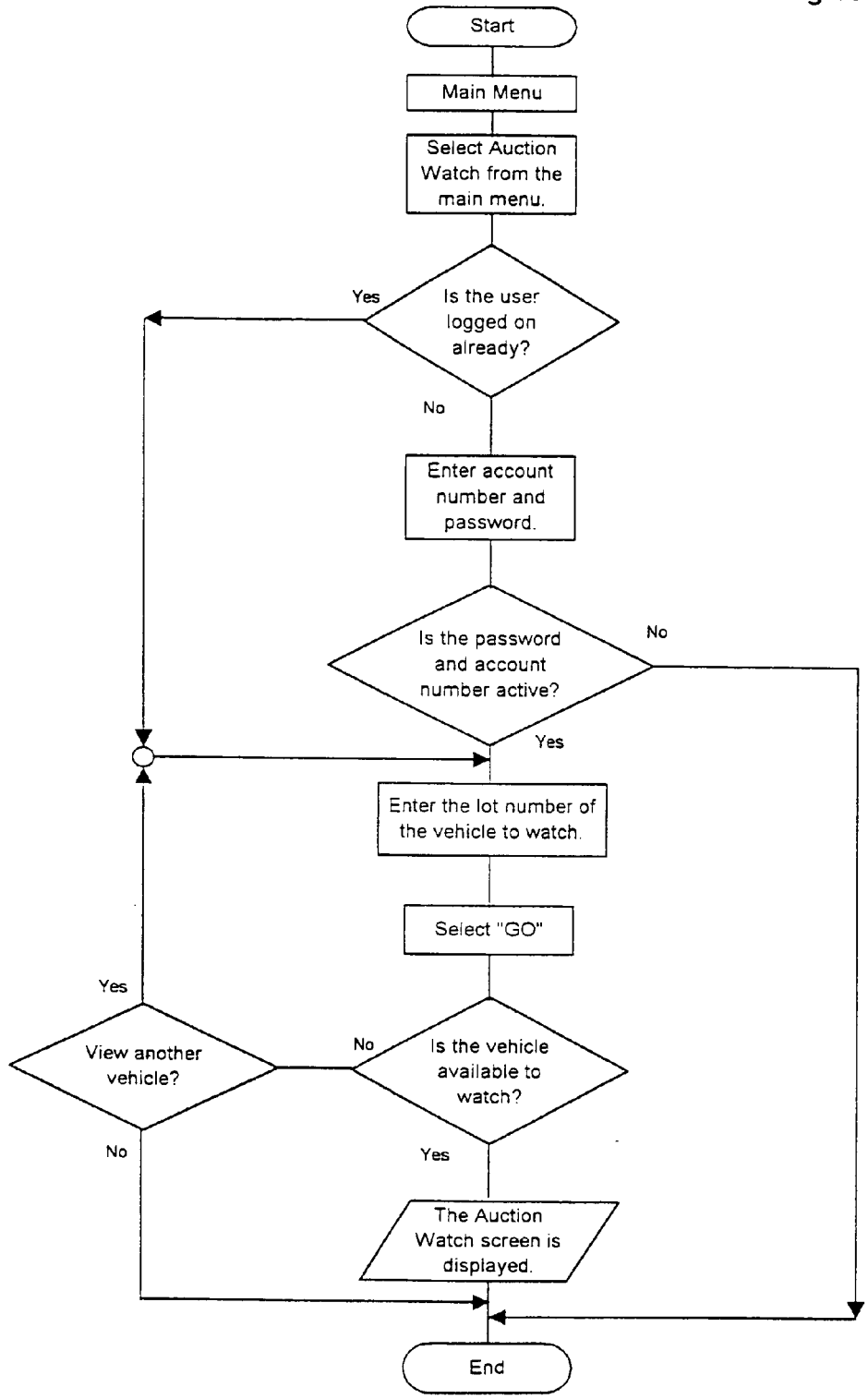
FIG. 12 is a flowchart of the routing of the software and the screens a user encounters when the user selects the "Auction Watch" button on the Main Menu.
Figure 13:
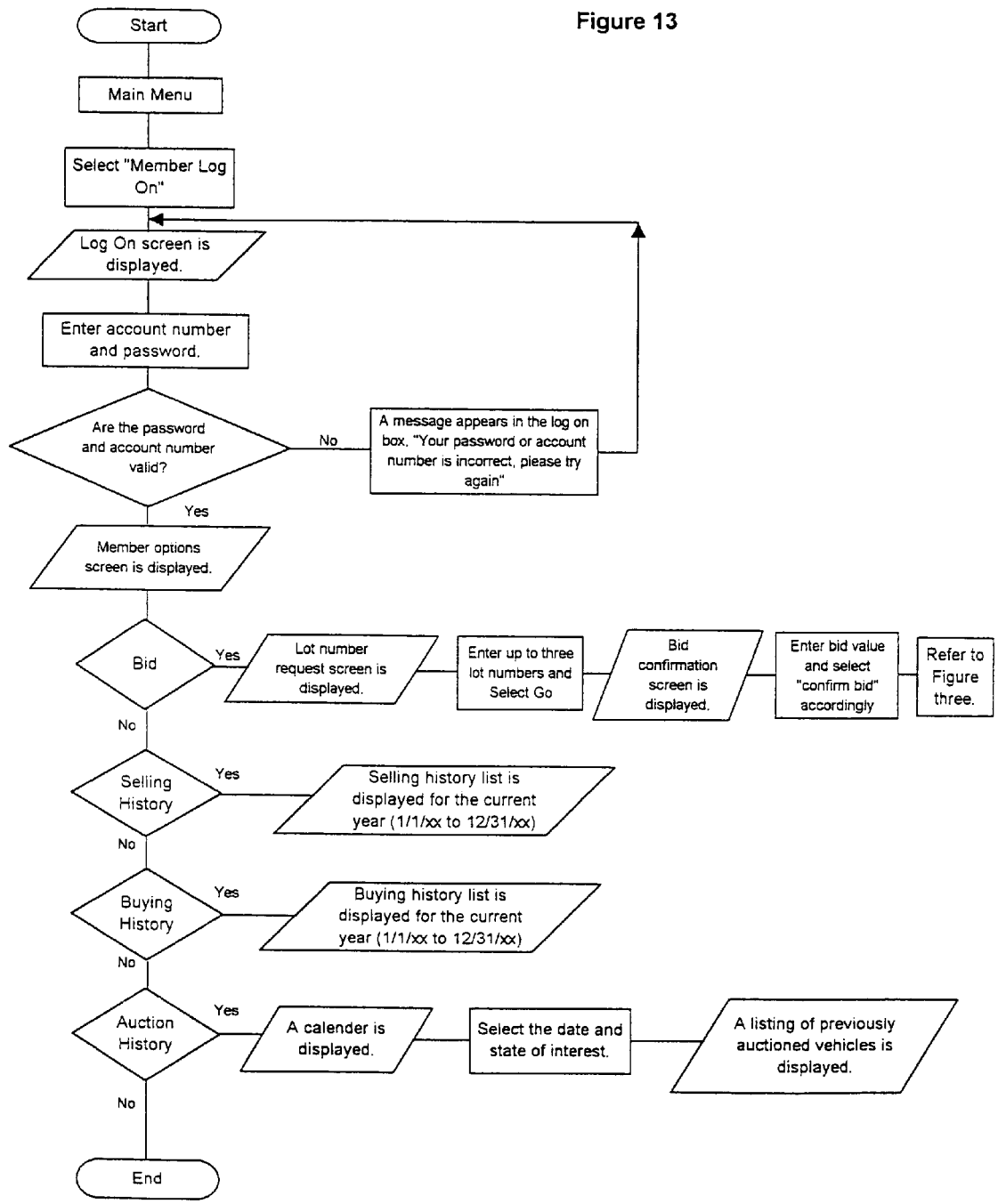
FIG. 13 is a flowchart of the routing of the software and the screens a user encounters when the user selects the "Member Log On" button on the Main Menu, including the routing of any selection from the Member Options screen.
Figure 14:
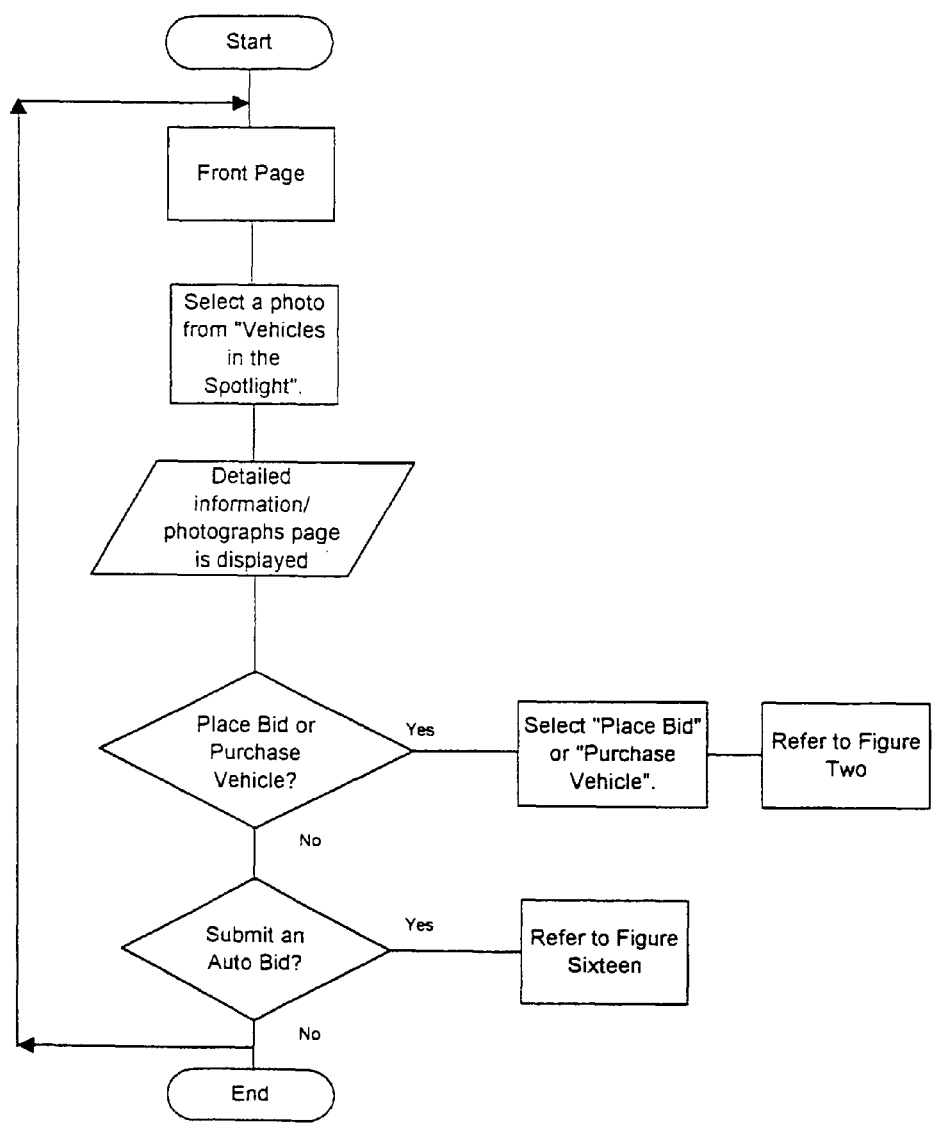
FIG. 14 is a flowchart of the routing of the software and the screens a user encounters when the user selects a photograph, as viewed from the "Vehicles In the Spotlight" block, from the Front Page of web site or the Main Menu.
Figure 15:
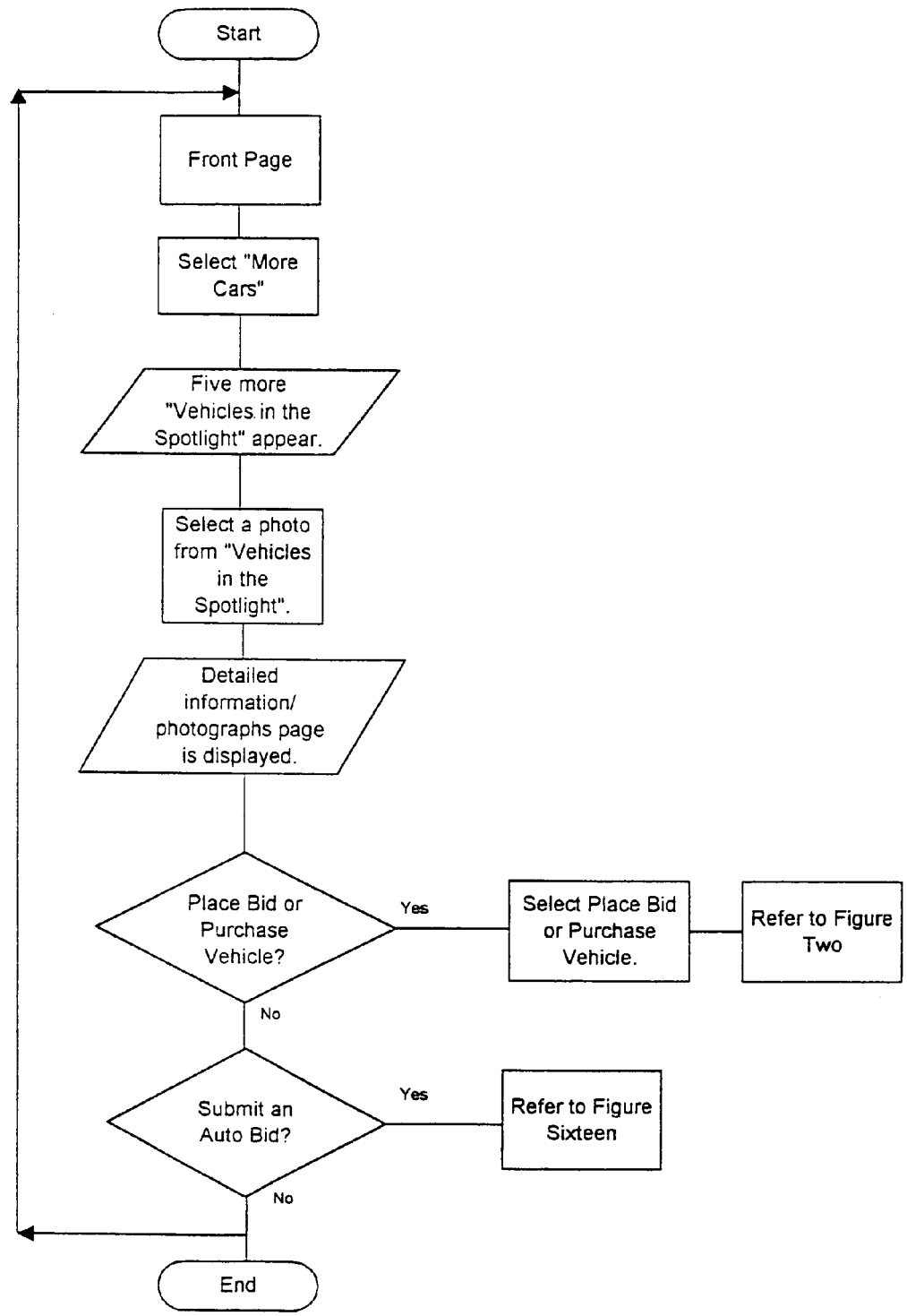
FIG. 15 is a flowchart of the routing of the software and the screens a user encounters when the user selects the "More Spotlight Cars" block, from the Front Page of the web site or the Main Menu.
Figure 16:
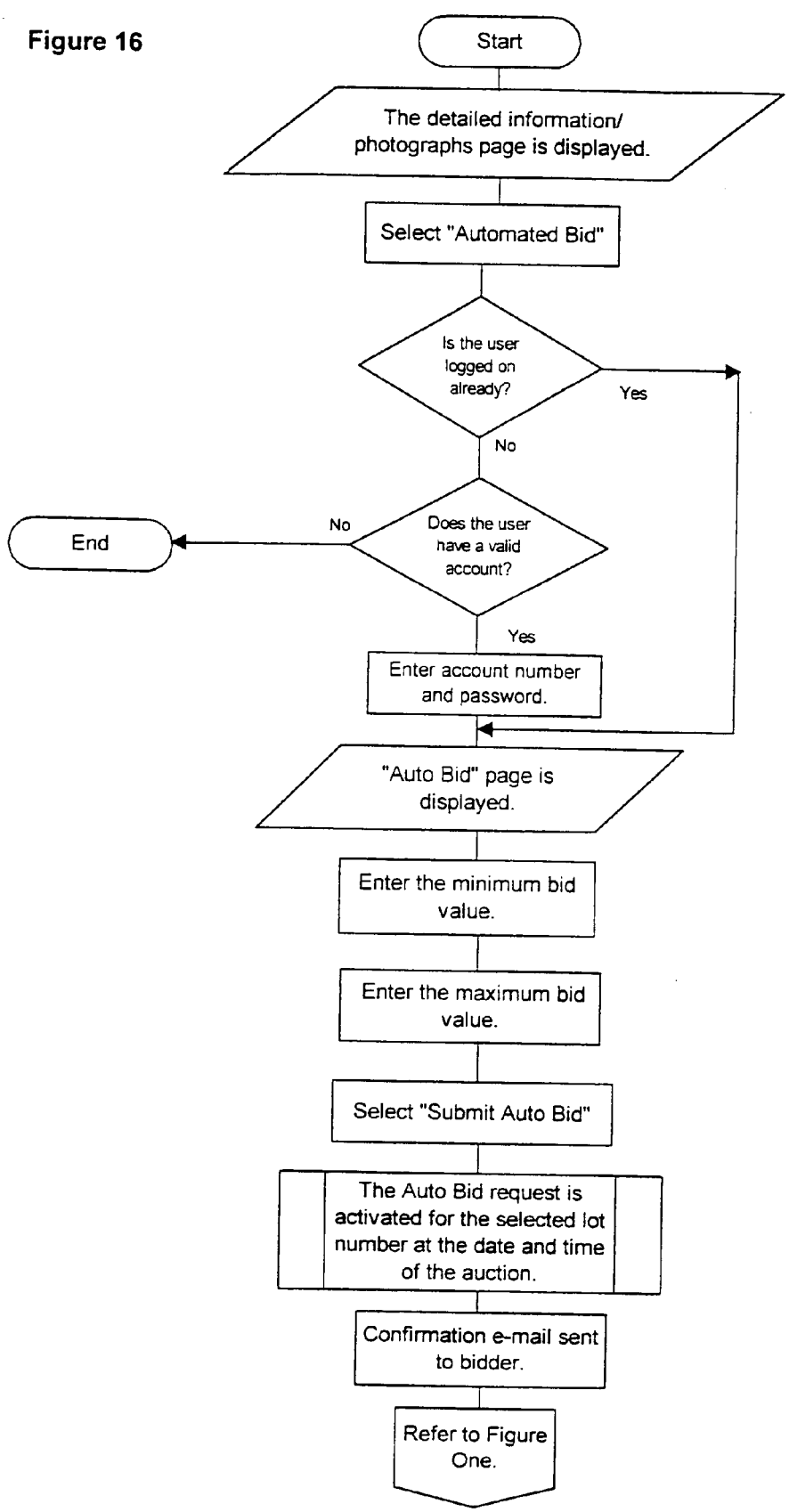
FIG. 16 is a flowchart of the routing of the software and the screens a user encounters when the user selects the "Automated Bid" block from the Detailed Information and Photographs Page.

The uppermost part of the screen displays a vehicle information box 94, which contains the lot number, year, make, and model of the vehicle to be auctioned, along with the retail value, auction date and time, and location of the vehicle. Directly below the vehicle information box is located a Start Time box 95 and Timer box 96. The Start Time box 95 allows a user to recognize at what time the auction actually starts, in case there is a fluctuation from the scheduled start time. The Timer box 96 notifies the user of the amount of time left for bidding before the existing highest bid is named a winner. Located to the right of the Start Time box 95 and Timer box 96 is the Top Ten bids list 97. This table is illustrated in FIG. 1.1 and serves as a real time output of the auction process so that the user may see how the bidding system works.

The auction timer controls the amount of time allotted for said auction process. A readout of the timer is displayed on said user interface terminals. The auction timer automatically resets upon entry of a bid higher than the previous highest bid.

The auction timer can be set for any time interval. The timer may be used for a four-minute time interval, but the preferred usage encompasses a two-minute time interval, starting at two minutes and counting down to zero. Upon expiration of said auction timer, the highest value entered in the auction process wins the auction and the system user corresponding to this bid value is notified by way of an e-mail transmission.

The Bidder Registration Form is shown in FIG. 35. The uppermost box of this form, the User Information Box 98, provides blocks for basic information regarding the individual or business such as Name, Address, Telephone Number, Drivers License, and Business License. Directly below this box is the License Box 99 which provides blocks for any licenses held by the user and below that is the Credit Card Box 100, which functions to allow the user to forward a credit card number in order to pay for all future purchases, without having to give the credit card number again.

The final box, located in the lowermost portion of the form is the Business Certification Box 101. When completed, this box serves to explain to the user, the terms of purchasing vehicles through this system. Once completed this box, along with the rest of the form, creates a contract between Auto Salvage and the user.

Figure 36:
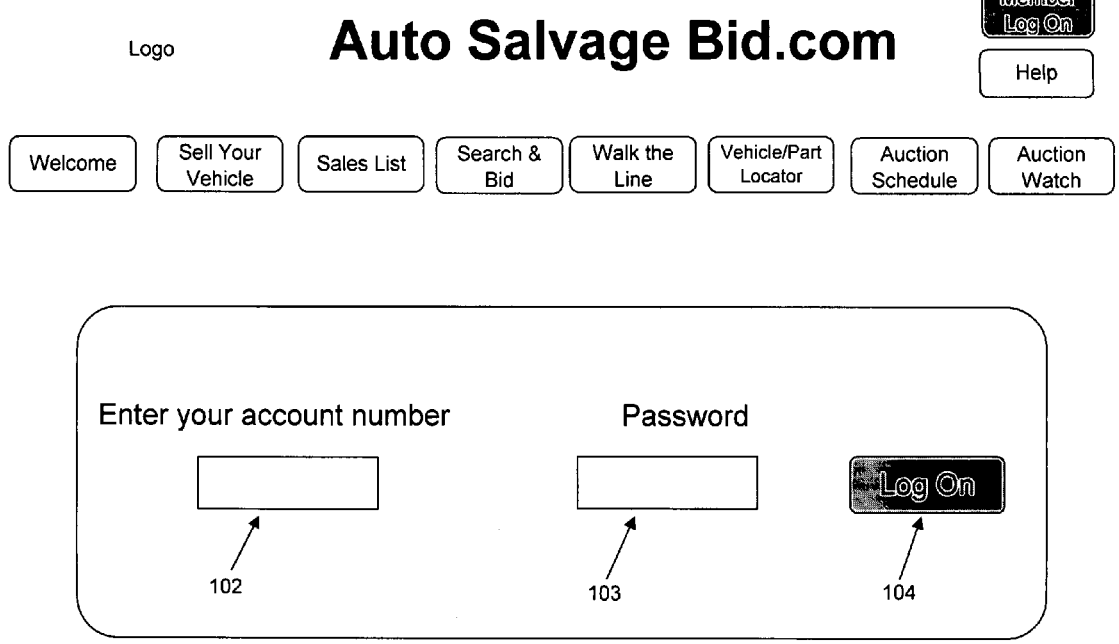
FIG. 36 shows the first Member Log On screen for the web site, as it appears upon access by a user, arrived at via the Internet.
Figure 37:
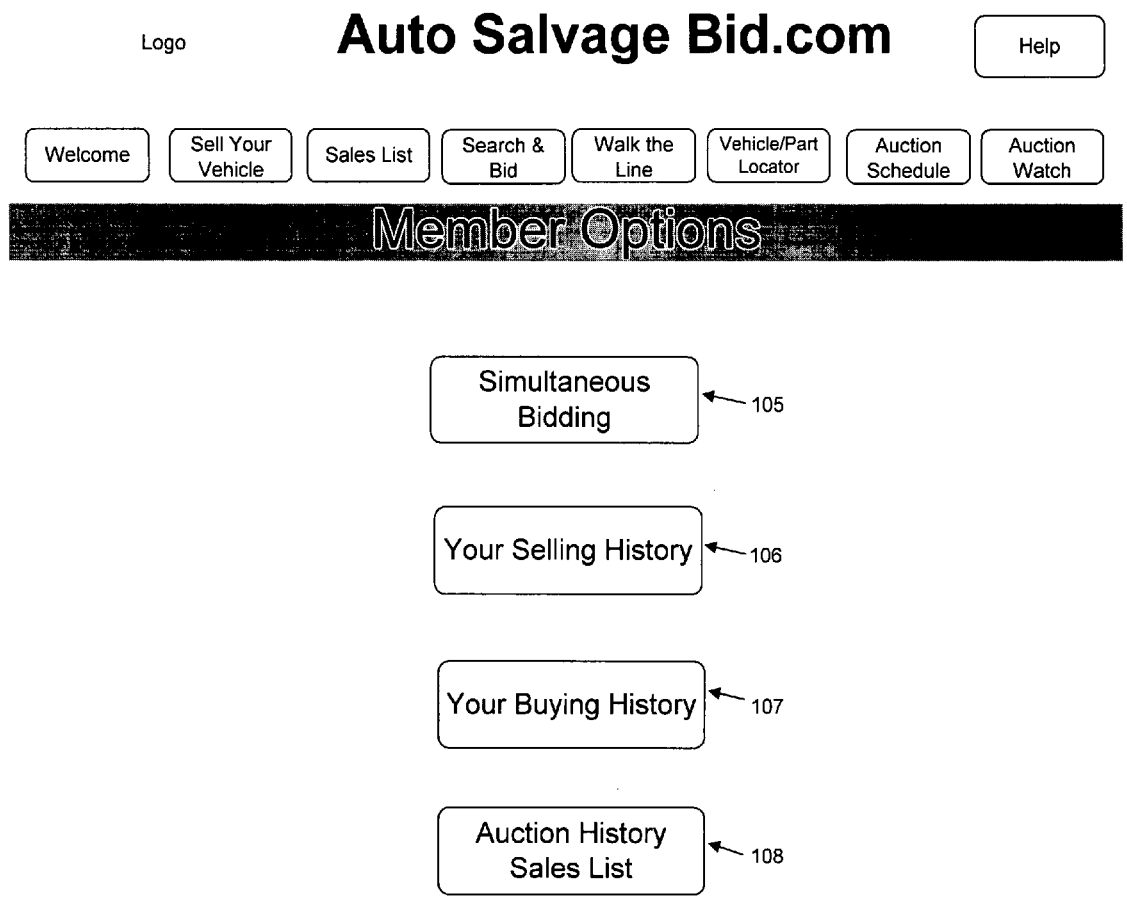
FIG. 37 shows the Member Options menu screen for the web site, as it appears upon access by a user, arrived at via the Internet.
Figure 38:
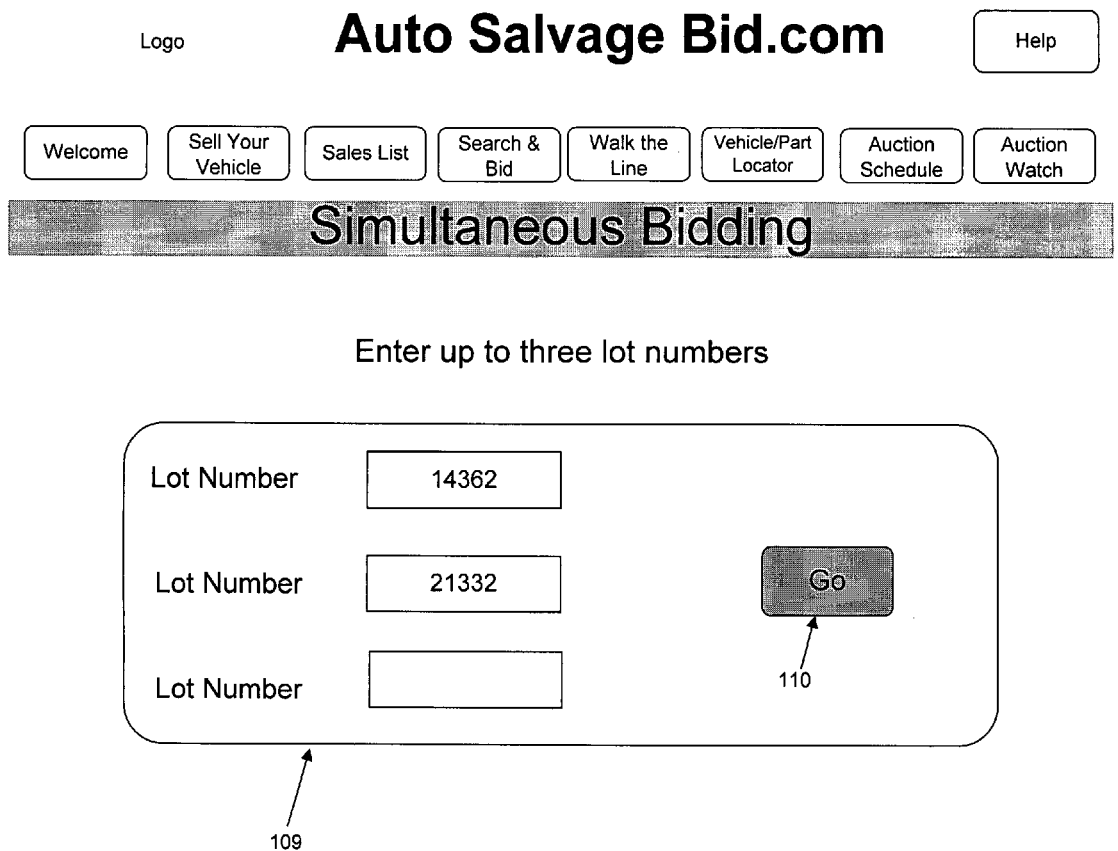
FIG. 38 shows the Simultaneous Bidding screen for the web site, as it appears upon access by a user, arrived at via the Internet.

The Member Log On button 26 is located on the upper right hand corner of the MAIN MENU screen (FIG. 18). When a user depresses the Member Log On button 26, the user is guided to the First Member Log On screen (FIG. 36). The user encounters the Enter Your Account Number Box 102 and Password Box 103 respectively. Next the user depresses the LOGON button 104 and is guided to Member Options menu (FIG. 37). This menu gives the user the choice of a simultaneous bidding button 105, your selling history button 106, your buying history button 107, and an auction history sales list button 108. Selecting the simultaneous bidding button 105 guides the user to the Simultaneous Bidding screen (FIG. 38).

The Simultaneous Bidding screen (FIG. 38) provides a Lot number box 109 inside which the user may enter up to three lot numbers for bidding. Once the bidder has entered the lot numbers, he may depress the Go button 110 and he is guided to the bidding screens described above. Upon depressing the Go button 110, the user is routed to screen displayed in FIG. 39. This screen operates in the same manner as the Confirm Your Bid screen (FIG. 29), with the exception of displaying multiple auctions simultaneously.

The Your Selling History Button 106 leads the user to the Your Selling History screen (FIG. 40), which gives the user an output of his selling history, listed chronologically from the user's first sale made to the user's last sale. The Output box 111 on the YOUR SELLING HISTORY screen (FIG. 40) gives the user the damage type, year, make model, body, mileage, sale date and sale price listed from left to right across the screen.

When the user depresses the YOUR BUYING HISTORY button 107 on the Member Log On screen (FIG. 36), the system guides the user to the YOUR BUYING HISTORY screen (FIG. 41), which gives the user an output of his buying history listed chronologically from the user's first purchase to the user's latest purchase. The Output box 112 on the YOUR BUYING HISTORY screen (FIG. 41) gives the user the damage type, year, make model, body, mileage, purchase date and purchase price listed from left to right across the screen.

When the user depresses the Auction History Sales List button 108 on the Member Log On screen (FIG. 36), the system guides the user to the Auction History Sales List screen (FIG. 42). The output box 113 on the Auction History Sales List screen, (FIG. 42), lists the states involved in the auction system. Underneath each state listed, the last two auctions that were held in that state are listed chronologically. The user can click on any one of these individual auctions in order to get details of the auction. FIG. 43 shows an example of the output box 114 a user would receive by making a selection from the Auction History Sales List screen (FIG. 42).

As another option from the Second Sales List (FIG. 22), if a user chooses a vehicle with the "A" denotation discussed above, the user will be routed to the Detailed Information/

Photographs Page (FIG. 44). Like the Third Sales List page (FIG. 23), this page also displays a photograph gallery 45 of the vehicles and generates information on each of the specific vehicles in the information box 46. The photographic gallery 45 supplies the user with different views of the vehicle interior and exterior, the vehicle engine and gives the user the choice of viewing a 15 second video of the engine during its start up. The one distinction between the Detailed Information/Photographs Page (FIG. 44) and Third Sales List page (FIG. 23) lies in that from the former may enter the auction process and bid on a vehicle.

FIG. 45 shows the complete list of Damage Descriptions. These descriptions appear in the respective DAMAGE boxes in either of FIG. 22, FIG. 23, FIG. 24, FIG. 27, FIG. 40, FIG. 41, FIG. 43 and FIG. 44.

The invention claimed is:

1. An interactive vehicle auction and sale system comprising:
a plurality of computers;
a computer network enabling communication between said plurality of computers;
a plurality of user interface terminals in connection with said computer network, said terminals utilized to display an amount of auction and sales information and to input a series of auction bids;
a plurality of databases and corresponding database servers for storage of an amount of vehicle statistics;
an input computer in communication with said network to receive and to route said amount of auction and sales information to a plurality of database servers;
a web server in communication with said plurality of user interface terminals and said plurality of database servers, through said network, said web server utilized to control said vehicle auction and sale system, coordinate said series of auction bids and maintain communications between said plurality of user interface terminals and a plurality of servers;
an applications server in communication with said network and said user interface terminals; said applications server containing a system software program for operating said interactive vehicle auction and sale system;
a vehicle image and video server in communication with said network and said user interface terminals, containing a plurality of electronic vehicle images and a plurality of vehicle video media to be accessed by said user terminals;
a template server in communication with said network and said user interface terminals, containing plurality of templates to be accessed by said user interface terminals in conjunction with said system software program, an amount of data from said template server utilized as a plurality of interactive computer screens;
a plurality of mail servers in communication with said network, said plurality of mail servers utilized to receive an amount of auction and sales information from said users; said mail servers also utilized to respond to said users;
a plurality of protection mechanisms contained within said network to protect said database servers from unwanted access;
a bank system connection in communication with said network to enable verification of a credit line of a vehicle purchaser; and
an auction timer, wherein said auction timer controls an amount of time allotted for said interactive vehicle auction and a readout of said timer is displayed on said user interface terminals, wherein said auction timer is programmed for a predetermined amount of time such that when the auction process begins, the timer begins to decrease in time from the predetermined time, and wherein upon submission of a higher bid than the previous bid on record by an individual participating in the auction, the auction timer resets to the original predetermined amount of time.

2. The interactive vehicle auction and sale system of claim 1 wherein, said auction timer automatically resets upon entry of a bid value higher then a currently pending highest bid value.

3. The interactive vehicle auction and sale system of claim 2 wherein, upon expiration of said auction timer, system user corresponding to said highest bid value entered in said interactive vehicle auction wins said interactive vehicle auction.

4. The interactive vehicle auction and sale system of claim 3 wherein, upon expiration of said auction timer, an electronic mail transmission is sent to said system user corresponding to said highest bid value.

5. The interactive vehicle auction and sale system of claim 4 wherein, said auction timer commences a count down process from a value of four minutes.

6. The interactive vehicle auction and sale system of claim 5 wherein, said auction timer commences said count down process from a value of two minutes.

7. The interactive vehicle auction and sale system of claim 6 wherein, said auction timer commences said count down process from a value of one minute.

8. The interactive vehicle auction and sale system of claim 1, wherein the system includes a starting time for the auction and does not provide a predetermined closing time prior to the auction.

* * * * *